US012643757B2

(12) United States Patent
Inoue et al.

(10) Patent No.: US 12,643,757 B2
(45) Date of Patent: Jun. 2, 2026

(54) SHEET CONVEYANCE APPARATUS AND IMAGE FORMING APPARATUS

(71) Applicant: CANON KABUSHIKI KAISHA, Tokyo (JP)

(72) Inventors: Hiroshige Inoue, Tokyo (JP); Takuya Kawasumi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/077,311

(22) Filed: Mar. 12, 2025

(65) Prior Publication Data

US 2025/0296795 A1 Sep. 25, 2025

(30) Foreign Application Priority Data

Mar. 21, 2024 (JP) ................................ 2024-045428

(51) Int. Cl.

*B65H 9/00* (2006.01)
*B41J 13/26* (2006.01)
*B65H 7/10* (2006.01)

(52) U.S. Cl.

CPC .............. *B65H 9/002* (2013.01); *B41J 13/26* (2013.01); *B65H 7/10* (2013.01); *B65H 2301/331* (2013.01); *B65H 2404/14212* (2013.01); *B65H 2404/143* (2013.01); (Continued)

(58) Field of Classification Search

CPC ..................... B41J 13/26; B65H 9/002; B65H 2404/14212; B65H 2404/15242; B65H 2404/143; B65H 2404/1431; B65H 2404/141; B65H 2404/1441; B65H 2404/1442; B65H 2301/331; B65H 2511/24; B65H 7/10; B65H 7/08; B65H 9/106; B65H 2511/216; B65H 2404/144; B65H 2515/34; B65H 9/00; B65H 2515/50

See application file for complete search history.

(56) References Cited

U.S. PATENT DOCUMENTS 8,356,814 B2 * 1/2013 Inoue ..................... B65H 9/006 271/226
11,807,492 B2 * 11/2023 Woo ......................... B65H 7/02

FOREIGN PATENT DOCUMENTS

JP 2013252918 A 12/2013
JP 2018199572 A 12/2018

* cited by examiner

*Primary Examiner* — Jeremy R Severson
(74) *Attorney, Agent, or Firm* — ROSSI, KIMMS & McDOWELL LLP

(57) ABSTRACT

A sheet conveyance apparatus includes a driving roller, a steering portion configured to change an inclination angle of a rotational axis of the driving roller, a follower roller configured to nip and convey a sheet together with the driving roller and pivot about a pivot axis, a contact/separation mechanism, a first detection portion configured to detect vibration of the follower roller, a second detection portion configured to detect positional deviation of the sheet, and a control portion configured to execute a correction operation of correcting the positional deviation of the sheet and to execute a predetermined process for causing the correction operation to be started after the driving roller and the follower roller have been switched from the separation state to the contact state and after the vibration of the follower roller has settled down within a predetermined range.

21 Claims, 18 Drawing Sheets

(52) U.S. Cl.
CPC .. *B65H 2404/1441* (2013.01); *B65H 2511/24* (2013.01); *B65H 2801/06* (2013.01)

ΔX = 15 (mm)

ΔX = 10 (mm)

ΔX = 5 (mm)

SHEET CONVEYANCE APPARATUS AND IMAGE FORMING APPARATUS

BACKGROUND OF THE INVENTION

Field of the Invention

The present invention relates to a sheet conveyance apparatus that conveys a sheet, and an image forming apparatus that forms an image on the sheet.

Description of the Related Art

Japanese Patent Application Laid-Open No. 2013-252918 discloses a sheet conveyance apparatus that roughly adjusts the skew amount of a sheet by a first skew correction portion and then finely adjusts the skew amount of the sheet by a second skew correction portion. Japanese Patent Application Laid-Open No. 2018-199572 discloses a conveyance apparatus that performs positional deviation control of the sheet nipped by a nipping roller pair, in the width direction and the rotational direction, by sliding a holding member holding the nipping roller pair in the width direction and pivoting the holding member.

SUMMARY OF THE INVENTION

The present invention provides a sheet conveyance apparatus and an image forming apparatus capable of improving correction precision of a positional deviation of a sheet.

According to an aspect of the invention, a sheet conveyance apparatus includes a driving roller configured to rotate by receiving a driving force, a steering portion configured to change an inclination angle of a rotational axis of the driving roller with respect to a sheet width direction orthogonal to a sheet conveyance direction, a follower roller configured to nip and convey a sheet together with the driving roller and pivot about a pivot axis intersecting with both the sheet conveyance direction and the sheet width direction by following change in the inclination angle of the driving roller, a contact/separation mechanism configured to switch the driving roller and the follower roller between a contact state in which the driving roller and the follower roller are in contact with each other and a separation state in which the driving roller and the follower roller are separated from each other, a first detection portion configured to detect vibration of the follower roller in a pivot direction about the pivot axis, a second detection portion configured to detect positional deviation of the sheet, and a control portion configured to execute a correction operation of correcting the positional deviation of the sheet on a basis of a detection result of the second detection portion and to execute a predetermined process on a basis of a detection result of the first detection portion, the predetermined process being a process for causing the correction operation to be started after the driving roller and the follower roller have been switched from the separation state to the contact state and after the vibration of the follower roller has settled down within a predetermined range.

Further features of the present invention will become apparent from the following description of exemplary embodiments with reference to the attached drawings.

DESCRIPTION OF THE EMBODIMENTS

Embodiments of the present disclosure will be described below with reference to drawings.

In the present disclosure, an "image forming apparatus" generally refers to an apparatus that forms an image on a sheet serving as a recording material (recording medium), and examples thereof include at least monofunctional printers, copiers, multifunctional apparatuses, and large printing machines for commercial use. In addition, the "image forming apparatus" is not limited to an ink jet recording apparatus described in the embodiments below, and may be an electrophotographic image forming apparatus including an image forming engine of an electrophotographic system as an image forming portion, or may be of a different system (for example, offset printing).

First Embodiment

Figure 1:
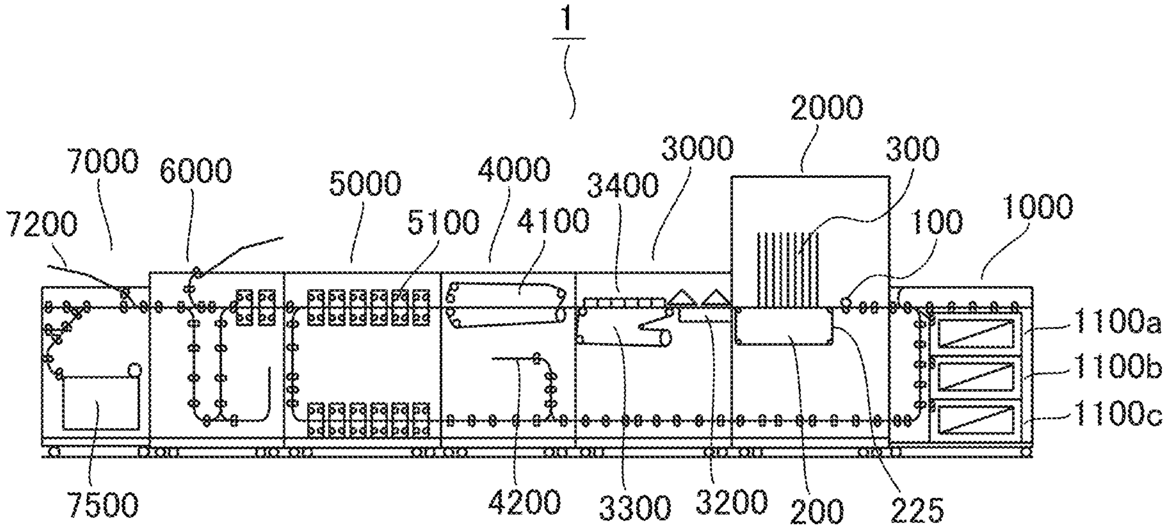
FIG. 1 is a schematic view of an ink jet recording apparatus according to a first embodiment.

FIG. 1 is a schematic diagram illustrating an example of a schematic configuration of an ink jet recording apparatus 1 serving as an image forming apparatus according to a first embodiment. This ink jet recording apparatus 1 is an ink jet recording apparatus of a sheet-by-sheet type that produces a recorded product in which an ink image is formed on a sheet S by using two kinds of liquid, which include a reaction liquid and an ink. As the sheet S serving as a recording material (recording medium), various sheet materials of different sizes and materials can be used. Examples of the sheet materials include paper sheets such as plain paper sheets and cardboards, surface-treated paper sheets such as coated paper sheets, sheet materials of irregular shapes such as envelopes and index paper sheets, plastic films, and cloths.

As illustrated in FIG. 1, the ink jet recording apparatus 1 of the present embodiment includes a feeding module 1000, a printing module 2000, a drying module 3000, a fixing module 4000, and a cooling module 5000. In addition, the ink jet recording apparatus 1 of the present embodiment includes a reversing module 6000, and a stacking module 7000. The sheet S of a cut paper shape supplied from the feeding module 1000 is conveyed along a conveyance path, is subjected to processing in each module, and is stacked in the stacking module 7000.

The feeding module 1000 includes three storage chambers 1100*a*, 1100*b*, and 1100*c* each storing sheets S. The storage chambers 1100*a* to 1100*c* can be each drawn to the front side of the apparatus with respect to the casing of the feeding module 1000. The feeding module 1000 conveys the sheets S stored in each of the storage chambers 1100*a* to 1100*c* one by one by to the printing module 2000 by a separation belt and a conveyance roller. To be noted, the number of the storage chambers 1100*a* to 1100*c* is not limited to three, and may be one, two, four, or more.

The printing module 2000 includes a registration unit 100, a printing belt unit 200, and a recording portion 300. The positional deviation of the sheet S conveyed from the feeding module 1000 is corrected by the registration unit 100, and then the sheet S is conveyed to the printing belt unit 200.

The registration unit 100 (and a drive source, a power source, a control portion, and the like required for the operation of the registration unit 100) is an example of a sheet conveyance apparatus that conveys the sheet S. The printing module 2000 or the ink jet recording apparatus 1 is an example of an image forming apparatus (image forming system) including the registration unit 100 (sheet conveyance apparatus) and the recording portion 300 serving as an image forming portion.

In the present embodiment, the “positional deviation” of the sheet S includes both the positional deviation of the sheet S in the sheet width direction (hereinafter referred to as “lateral deviation”) and the positional deviation of the sheet S in the rotational direction when the sheet S is viewed in the thickness direction (hereinafter referred to as a “skew”). Correcting the skew of the sheet S will be referred to as skew correction. Positioning the sheet S at a desired position in the sheet width direction by correcting the lateral deviation of the sheet S will be referred to as lateral registration. The registration unit 100 executes a correction operation of simultaneously correcting both the skew and lateral deviation of the sheet S a plurality of times as will be described later. To be noted, the registration unit 100 may correct only one of the lateral deviation and skew, or may perform the correction operation only once.

The printing belt unit 200 includes a printing belt 225 stretched over a plurality of rollers and having breathability, and a pump unit that generates a negative pressure in a space on the inner peripheral side of the printing belt 225. The recording portion 300 is a sheet processing portion (image forming portion) that forms an image by performing a recording process (printing), from above and by a recording head, on the sheet S conveyed thereto. The sheet S is conveyed by the printing belt unit 200 in a state in which the sheet S is attracted to the printing belt 225 by suction, and thus a clearance is secured between the recording head and the sheet S. In addition, a plurality of recording heads are arranged in the conveyance direction. In the present embodiment, five linear recording heads respectively corresponding to four colors of yellow (Y), magenta (M), cyan (C), and black (Bk) and also a reaction liquid are provided.

To be noted, the number of colors or recording heads is not limited to five. For the ink jet system, a system including a heat generating element, a system including a piezo element, a system including an electrostatic element, a system including a micro electro mechanical system (MEMS), or the like can be employed. The inks of respective colors are each supplied to the recording head from an ink tank via an ink tube. The sheet S on which an image has been formed by the recording portion 300 is conveyed by the printing belt unit 200, and the printed image can be corrected by detecting the deviation and color density of the image formed on the sheet S by an in-line scanner disposed on the downstream side of the recording portion in the conveyance direction.

The drying module 3000 includes a decoupling portion 3200, a drying belt unit 3300, and a hot air blowing portion 3400. The drying module 3000 is a unit that reduces a liquid component contained in the ink applied on the sheet S by the recording portion 300 to enhance the fixation between the sheet S and the ink. The sheet S on which an image has been formed by the recording portion 300 of the printing module 2000 is conveyed to the decoupling portion 3200 disposed in the drying module 3000. In the decoupling portion 3200, the sheet S can be conveyed by a combination of a wind pressure from above and a friction between the belt and the sheet S, and the deviation of the sheet S on the printing belt unit 200 that forms an ink image can be suppressed by conveying the sheet S on the belt while gently holding the sheet S. The sheet S conveyed from the decoupling portion 3200 is conveyed while being attracted by suction in the drying belt unit 3300, and simultaneously the ink-applied surface of the sheet S is dried by applying a hot air thereto from the hot air blowing portion 3400 disposed above the belt. To be noted, the drying system may be a combination of a system of irradiating the surface of the sheet S with an electromagnetic wave (ultraviolet light, infrared light, or the like) and a heat conduction system by contact with a heat generating element instead of the system of applying a hot air.

The fixing module 4000 includes a fixing belt unit 4100 including an upper belt unit and a lower belt unit. The fixing module 4000 can fix the ink to the sheet S by allowing the sheet S conveyed from the drying module 3000 to pass through a gap between the heated upper belt unit and the lower belt unit.

The cooling module 5000 includes a plurality of cooling portions 5100, and cools the sheet S of a high temperature conveyed from the fixing module 4000. The cooling portion 5100 takes in the outside air into a cooling box, increases the pressure in the cooling box, and cools the sheet S by blowing a wind discharged from a nozzle formed in a conveyance guide onto the sheet S. The cooling portions 5100 are provided on two sides with respect to the conveyance path, and can cool the both surfaces of the sheet S. In addition, a conveyance path switching portion is disposed in the cooling module 5000. The conveyance path switching portion switches the conveyance path of the sheet S between the path for conveying the sheet S to the reversing module 6000 and a duplex conveyance path used for duplex printing. In duplex printing, the sheet S on a first surface of which an image has been formed is conveyed to a conveyance path below the cooling module 5000, and is conveyed in each duplex conveyance path of the fixing module 4000, drying module 3000, printing module 2000, and feeding module 1000. Then, the sheet S is conveyed to the registration unit 100, the printing belt unit 200, and the recording portion 300 of the printing module 2000 again, and an image is formed on the second surface of the sheet S opposite to the first surface by the recording portion 300.

The duplex conveyance portion of the fixing module 4000 includes a first reversing portion 4200 that flips the front side and the back side of the sheet S. In addition, the reversing module 6000 includes a second reversing portion, can flip the front side and the back side of the sheet S conveyed thereto, and thus can freely change which surface of the sheet S to be discharged faces up.

The stacking module 7000 includes a top tray 7200 and a stacking portion 7500, and stacks sheets S thereon conveyed from the reversing module 6000 while aligning the sheets S.

Registration Unit

Figure 2:
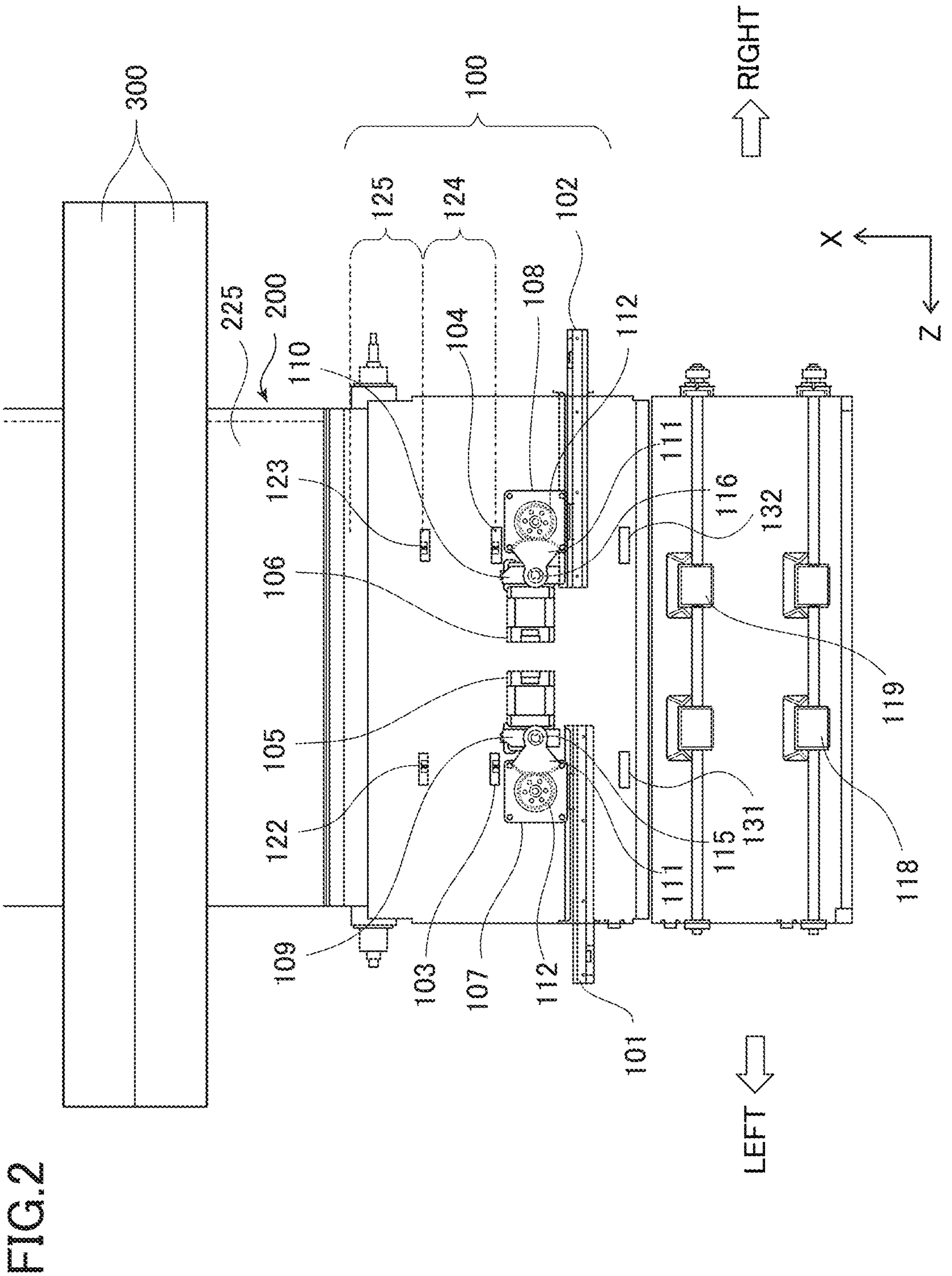
FIG. 2 is a top view of a registration unit according to the first embodiment.
Figure 3:
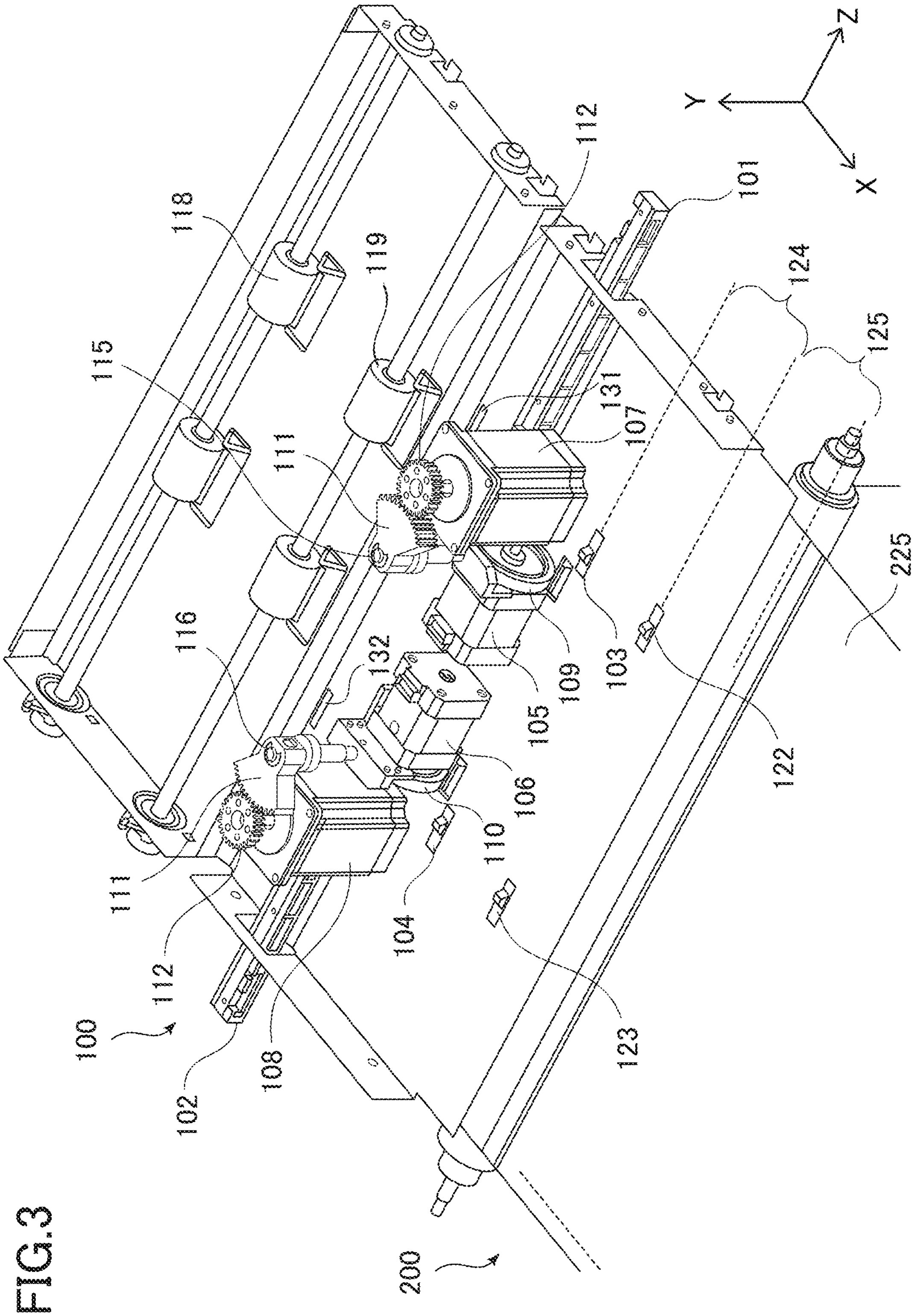
FIG. 3 is a perspective view of the registration unit according to the first embodiment.
Figure 4A:
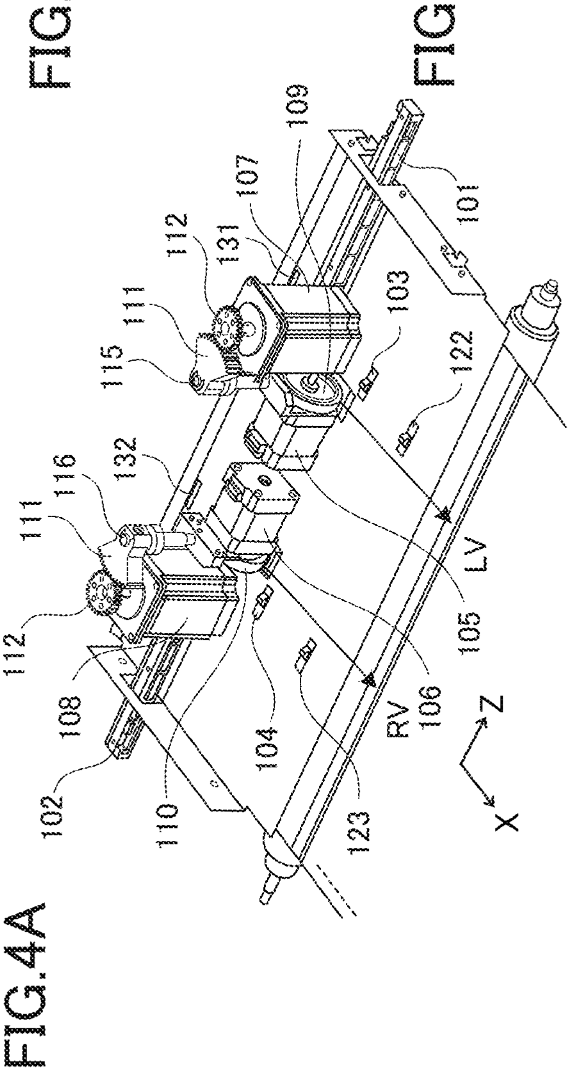
FIGS. 4A to 4E are explanatory diagrams of the registration unit according to the first embodiment.
Figure 4B:
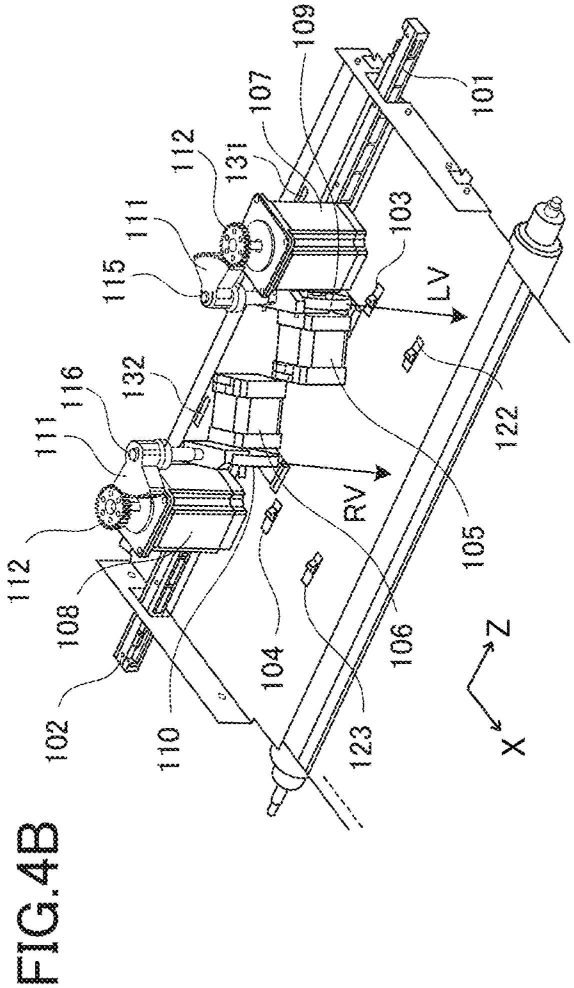
Figure 4C:
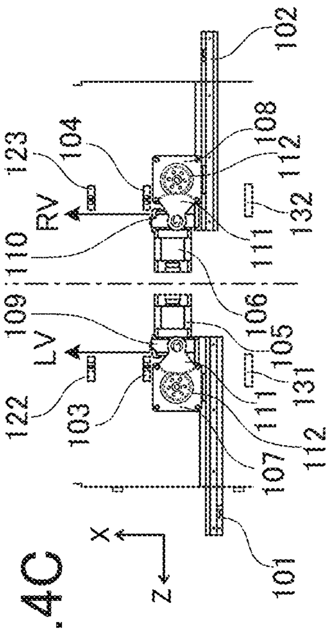
Figure 4D:
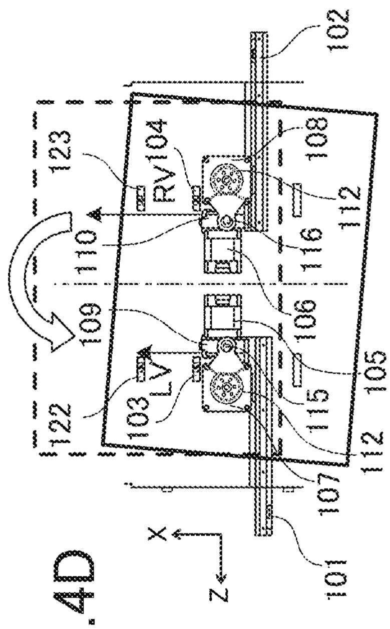
Figure 4E:
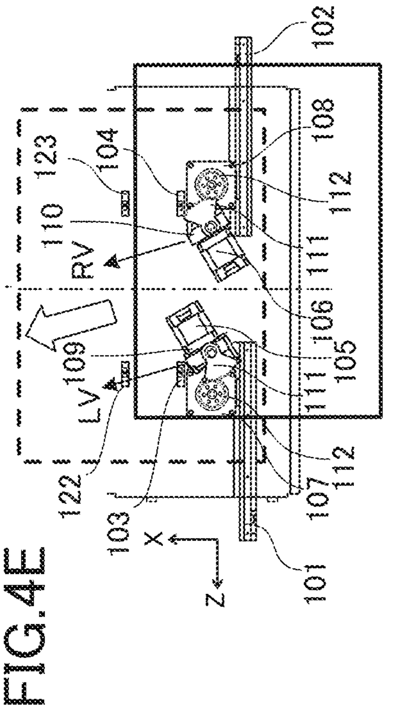
Figure 5:
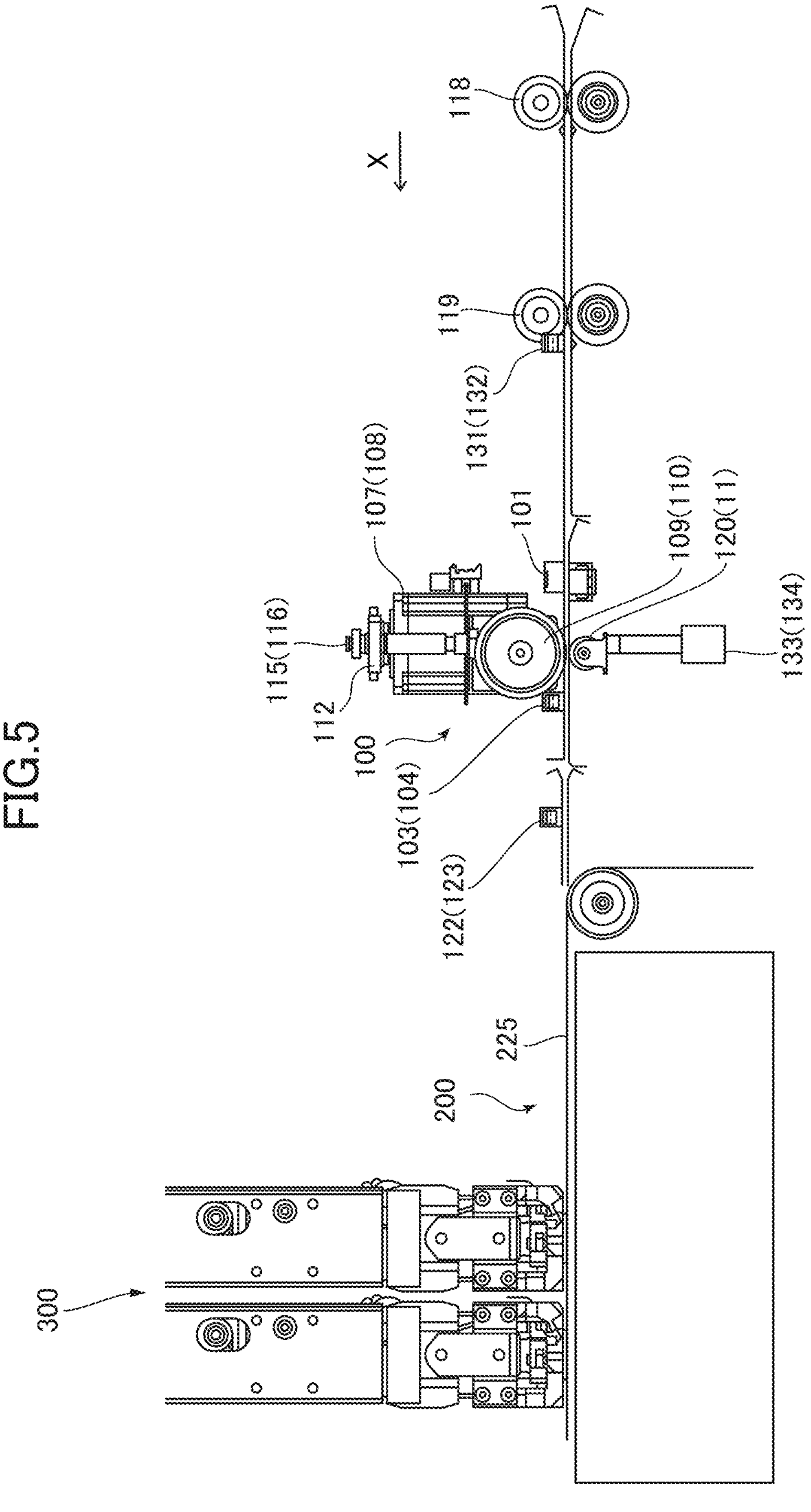
FIG. 5 is a section view of the registration unit according to the first embodiment.
Figure 6A:
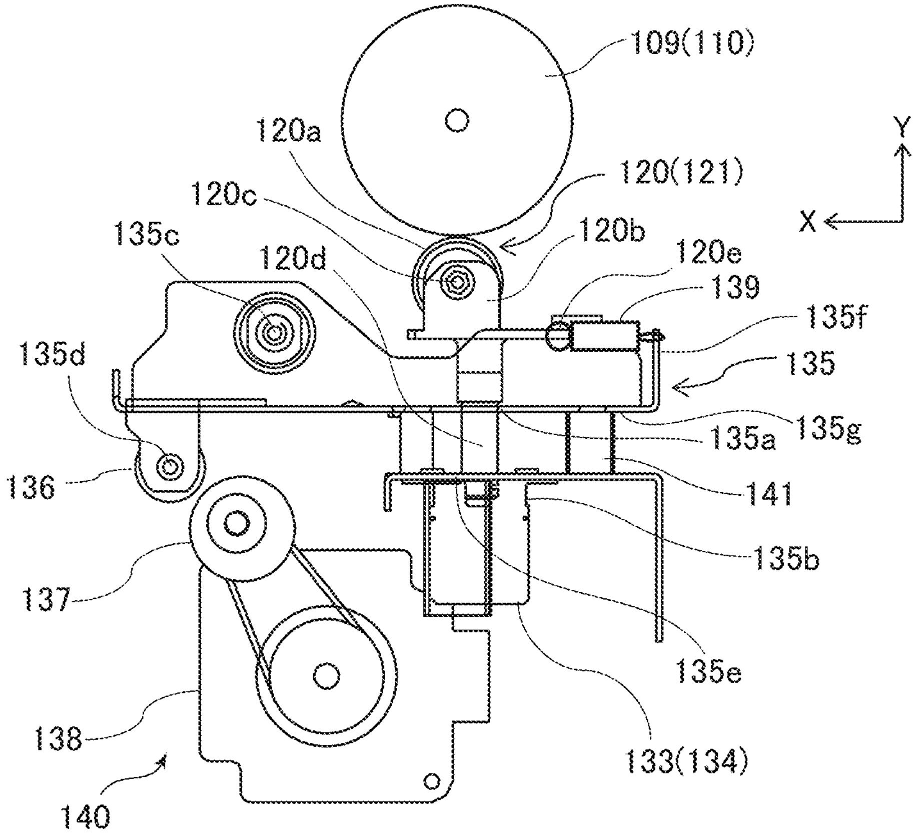
FIG. 6A is a diagram illustrating a contact/separation mechanism of a caster roller according to the first embodiment.
Figure 6B:
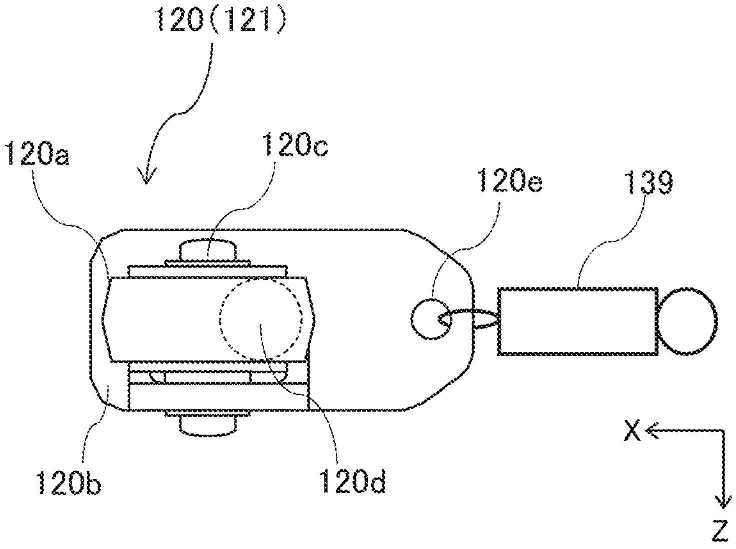
FIG. 6B is a top view of the caster roller according to the first embodiment.

The summary of the registration unit 100 will be described. FIG. 2 is a top view of the registration unit 100. FIG. 3 is a perspective view of the registration unit 100. FIGS. 4A to 4E are each an explanatory diagram of the operation of registration rollers 109 and 110. FIG. 5 is a section view of the registration unit 100 taken along a plane orthogonal to the sheet width direction. FIGS. 6A and 6B are each a schematic diagram illustrating a configuration of caster rollers 120 and 121 (follower rollers).

The conveyance direction of the sheet S in the registration unit 100 will be referred to as a sheet conveyance direction in the descriptions and drawings below, and will be indicated by an arrow X in the drawings. The sheet width direction orthogonal to the sheet conveyance direction will be indicated by an arrow Z in the drawings. In the sheet width direction (Z), the left side (distal end side of the arrow Z, +Z side) as viewed in the sheet conveyance direction (X) will be referred to as the “left”, and the right side (opposite side of the arrow Z, −Z side) as viewed in the sheet conveyance direction (X) will be referred to as the “right”. In addition, a direction orthogonal to both the sheet conveyance direction (X) and the sheet width direction (Z) will be indicated by an arrow Y in the drawings.

To be noted, in the registration unit 100, there is a case where the sheet S is obliquely conveyed by using registration roller pairs (109 and 110) to correct the sheet position in the sheet width direction. The “sheet conveyance direction (X)” indicates the same direction regardless of whether or not the sheet Sis obliquely conveyed. Specifically, the sheet conveyance direction (X) in the present embodiment is parallel to the conveyance direction of the sheet S by conveyance members that convey the sheet S not obliquely on the upstream side and the downstream side of the registration roller pairs (109 and 110). Conveyance roller pairs (118 and 119) described below serve as an example of the conveyance members on the upstream side of the registration roller pairs (109 and 110), and a printing belt 225 described below serves as an example of the conveyance member on the downstream side.

As illustrated in FIGS. 2, 3, and 5, the registration unit 100 includes conveyance roller pairs 118 and 119, registration rollers 109 and 110, caster rollers 120 and 121, conveyance driving motors 105 and 106, and steering motors 107 and 108. In addition, the registration unit 100 includes image sensors 101 and 102, pre-registration sensors 131 and 132, first registration sensors 103 and 104, second registration sensors 122 and 123, and pivot angle sensors 133 and 134.

The registration rollers 109 and 110 are each an example of a driving roller that rotates by receiving a driving force. The caster rollers 120 and 121 are each an example of a follower roller that nips and conveys the sheet together with the driving roller. In the case where the registration roller 109 and the caster roller 120 disposed on one side in the sheet width direction (Z) are referred to as a first driving roller and a first follower roller, the registration roller 110 and the caster roller 121 disposed on the other side in the sheet width direction (Z) can be referred to as a second driving roller and a second follower roller.

The registration roller 109, the caster roller 120, the conveyance driving motor 105, the steering motor 107, the image sensor 101, the pre-registration sensor 131, the first registration sensor 103, the second registration sensor 122, and the pivot angle sensor 133 are disposed on the left side. Similarly, the registration roller 110, the caster roller 121, the conveyance driving motor 106, the steering motor 108, the image sensor 102, the pre-registration sensor 132, the first registration sensor 104, the second registration sensor 123, and the pivot angle sensor 134 are disposed on the right side.

In the sheet conveyance direction (X), the conveyance roller pair 119 is disposed at a position downstream of the conveyance roller pair 118, the registration roller pairs (109, 110, 120, and 121) are disposed at positions downstream of the conveyance roller pair 119, and the printing belt unit 200 is disposed at a position downstream of the registration roller pairs. The conveyance roller pairs 118 and 119 are each constituted by an upper roller that is a rubber roller, and a lower roller that is in contact with the upper roller. The upper roller is rotationally driven by a motor. The lower roller is urged toward the upper roller by a spring, and rotates by following the upper roller.

The registration rollers 109 and 110 and the caster rollers 120 and 121 constitute roller pairs (registration roller pairs) that nip and convey the sheet S. In the present embodiment, the left registration roller 109 and the left caster roller 120 constitute a left registration roller pair, and the right registration roller 110 and the right caster roller 121 constitute a right registration roller pair.

The registration rollers 109 and 110 are, for example, each a rubber roller (elastic roller) having an outer peripheral portion formed from polyurethane. The left registration roller 109 is rotationally driven by the left conveyance driving motor 105, and the right registration roller 110 is rotationally driven by the right conveyance driving motor 106.

In addition, the left steering motor 107 changes the steering angle of the left registration roller 109. The right steering motor 108 changes the steering angle of the right registration roller 110. By changing the steering angles of the registration rollers 109 and 110, a component in the sheet width direction (Z) is generated in the conveyance force applied to the sheet S from the registration rollers 109 and 110, and therefore the sheet S can be obliquely conveyed with respect to the sheet conveyance direction (X).

The steering angle of the registration rollers 109 and 110 is an inclination angle of the rotational axis of the roller with respect to the sheet width direction (Z) as viewed in the Y direction orthogonal to both the sheet conveyance direction (X) and the sheet width direction (Z). The steering angle may be referred to as an angle of the movement direction of the roller surface at a contact portion with the sheet S with respect to the sheet conveyance direction (X), or an inclination angle of the vector of the force (conveyance force) applied to the sheet S by the registration rollers 109 and 110 with respect to the sheet conveyance direction (X). In the description below, the "pivot" of the roller refers to a motion in which the steering angle of the roller changes as a result of rotation of the rotational axis of the roller about an axis intersecting with both the sheet width direction (Z) and the sheet conveyance direction (X). The "intersecting axis" described above is, for example, an axis parallel to the Y direction, but does not have to be parallel to the Y direction.

The left caster roller 120 is a follower roller that rotates by following the left registration roller 109. The right caster roller 121 is a follower roller that rotates by following the right registration roller 110. The caster roller 120 can pivot by following the pivot of the registration roller 109. The caster roller 121 can pivot by following the pivot of the registration roller 110. That is, the caster rollers 120 and 121 (follower rollers) are configured to pivot about a pivot axis intersecting with both the sheet conveyance direction and the sheet width direction by following the change in the inclination angles of the registration rollers 109 and 110 (driving rollers). The pivot axis in the present embodiment is parallel to the Y direction.

For each of the caster rollers 120 and 121, the inclination angle of the rotational axis of the roller with respect to the sheet width direction (Z) will be referred to as a "pivot angle". The left pivot angle sensor 133 detects the pivot angle of the left caster roller 120, and the right pivot angle sensor 134 detects the pivot angle of the right caster roller 121. The pivot angle sensors 133 and 134 respectively function as first detection portions configured to detect the vibration of the caster rollers 120 and 121 (follower rollers) in the pivot direction about the pivot axis.

Skew Detection Portion

A group of two or more sensors disposed at different positions in the sheet width direction (Z) can function as a skew detection portion for detecting the skew amount of the sheet S. The "skew amount" corresponds to the inclination angle of the leading end (downstream end in the sheet conveyance direction) of the sheet S with respect to the sheet width direction (Z).

The pair of left and right pre-registration sensors 131 and 132, the pair of left and right first registration sensors 103 and 104, and the pair of left and right second registration sensors 122 and 123 are each an example of a detection portion for detecting the positional deviation of the sheet S. In the present embodiment, the pair of left and right pre-registration sensors 131 and 132, the pair of left and right first registration sensors 103 and 104, and the pair of left and right second registration sensors 122 and 123 are each an example of a skew detection portion for detecting the skew, which is positional deviation of the sheet S in the rotational direction. In the case where the pair of second registration sensors 122 and 123 is referred to as a second detection portion, the pair of first registration sensors 103 and 104 can be referred to as a third detection portion, and the pair of pre-registration sensors 131 and 132 upstream thereof can be referred to as a fourth detection portion.

The skew detection portion can be also referred to as a posture detection portion that detects the posture of the sheet S. The posture of the sheet S is the inclination angle of the leading end of the sheet S with respect to the sheet width direction (Z).

A controller 50 (FIG. 7) that will be described later calculates the skew amount of the sheet S at the position (first position) of the pre-registration sensors 131 and 132 on the basis of the time difference between the timings at which the left and right pre-registration sensors 131 and 132 have detected the leading end of the sheet S. Similarly, the controller 50 calculates the skew amount of the sheet S at the position (second position) of the first registration sensors 103 and 104 on the basis of the time difference between the timings at which the left and right first registration sensors 103 and 104 have detected the leading end of the sheet S. The controller 50 calculates the skew amount of the sheet S at the position (third position) of the second registration sensors 122 and 123 on the basis of the time difference between the timings at which the left and right second registration sensors 122 and 123 have detected the leading end of the sheet S. To be noted, for example, an image sensor (line sensor or area sensor) may be used as a light-shielding detection portion instead of the group of two or more sensors.

Lateral Deviation Detection Portion

The pair of the image sensors 101 and 102 is an example of a detection portion (second detection portion) configured to detect the positional deviation of the sheet S. In the present embodiment, the pair of the image sensors 101 and 102 is a lateral deviation detection portion that detects the lateral deviation that is a positional deviation of the sheet S in the sheet width direction (Z).

The image sensors 101 and 102 are disposed in the vicinity of the registration roller pairs (109, 110, 120, and 121). The image sensors 101 and 102 are each a line sensor having an imaging region extending in the sheet width direction (Z). The left image sensor 101 detects the position of the left end of the sheet S, and the right image sensor 102 detects the position of the right end of the sheet S. The image sensors 101 and 102 are each disposed to be capable of detecting a side end of sheets of a maximum size and a minimum size among sheets on which the ink jet recording apparatus 1 can form an image. The controller 50 can calculate the lateral deviation amount on the basis of the detection result of the side end position obtained by the left and right image sensors 101 and 102.

To be noted, one image sensor that, in the sheet width direction (Z), covers a region (maximum sheet passing region) that the sheet S of the maximum size passes may be used instead of the two image sensors 101 and 102. In addition, the detection of the lateral deviation amount and the correction of the lateral deviation may be performed on the basis of the detection result of one side end position by using only one of the left and right image sensors 101 and 102.

Controller

Figure 7:
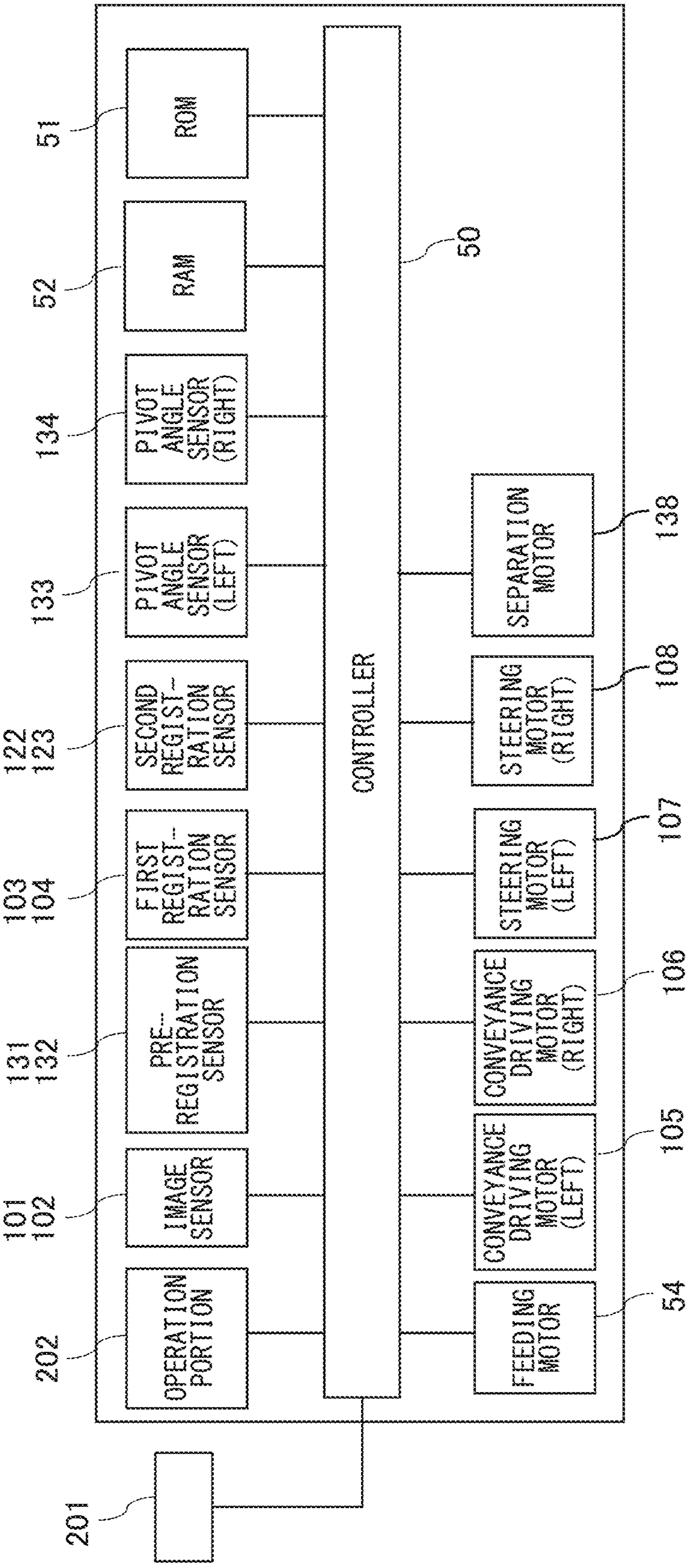
FIG. 7 is a block diagram illustrating a control system according to the first embodiment.

FIG. 7 is a block diagram illustrating a configuration related to control of the registration unit 100. The operation of the registration unit 100 is controlled by the controller 50 serving as a control portion. The controller 50 is connected to a read-only memory (ROM) 51 and a random access memory (RAM) 52 serving as a storage portion. For example, on the basis of an instruction from an external computer 201, the controller 50 reads out a program stored in the ROM 51, executes the program by using the RAM 52 as a work memory, and thus controls the operation of the registration unit 100. The controller 50 may be a control portion that integrally controls the overall operation of the printing module 2000. To be noted, part or all of the functions of the controller 50 that will be described later may be executed by a different control portion included in the ink jet recording apparatus 1.

The controller 50 receives input of detection signals from the image sensors 101 and 102, the pre-registration sensors 131 and 132, the first registration sensors 103 and 104, the second registration sensors 122 and 123, and the pivot angle sensors 133 and 134. In addition, the controller 50 gives instructions to a feeding motor 54, the steering motors 107 and 108, conveyance driving motors 105 and 106, and the separation motor 138, and thus controls activation/deactivation, rotational speed, angular velocity, and the like of each motor. The feeding motor 54 is a drive source for a separation belt and the like in the feeding module 1000.

In addition, the controller 50 is communicably connected to the operation portion 202 that is a user interface of the ink jet recording apparatus 1. The operation portion 202 includes a display portion such as a liquid crystal panel that presents information to the user as an image, and an input portion such as a button and a touch panel function of the liquid crystal panel that receive input from the user.

As will be described later, the controller 50 executes a correction operation of correcting the positional deviation of the sheet S on the basis of detection results of the skew detection portion and the lateral deviation detection portion. The controller 50 controls the rotational speed of the steering motor 107 and 108 mainly on the basis of the detection result of the image sensors 101 and 102, and thus performs the lateral deviation correction of the sheet S. In addition, the controller 50 controls the angular velocity of the left and right conveyance driving motors 105 and 106 mainly on the basis of the detection results of the pre-registration sensors 131 and 132, the first registration sensors 103 and 104, and the second registration sensors 122 and 123, and thus performs skew correction of the sheet S.

In addition, the controller 50 brings the left and right caster rollers 120 and 121 into contact with and out of contact from the registration rollers 109 and 110 by using the separation motor 138. In addition, the controller 50 detects the pivot angles of the left and right caster rollers 120 and 121 and detects vibration in the pivot direction (vibration of the pivot angle) on the basis of the detection result of the left and right pivot angle sensors 133 and 134.

Skew Correction

The skew correction of the sheet S in the registration unit 100 will be described. As illustrated in FIGS. 4A and 4B, in the present embodiment, the conveyance driving motors 105 and 106 are provided respectively for the left and right registration rollers 109 and 110. Therefore, conveyance speeds LV and RV (mm/sec) of the left and right registration rollers 109 and 110 can be controlled independently (FIGS. 4C and 4D). The conveyance speeds LV and RV of the registration rollers 109 and 110 refer to the peripheral speeds at nip portions between the registration rollers 109 and 110 and the caster rollers 120 and 121.

In the case where the sheet S is skewed, the controller 50 corrects the skew of the sheet S by generating a speed difference between the left and right registration rollers 109 and 110. The controller 50 of the present embodiment calculates the skew amount of the sheet S on the basis of the detection result of the skew detection portion described above, and determines the skew correction profile on the basis of the calculated skew amount.

Figure 8A:
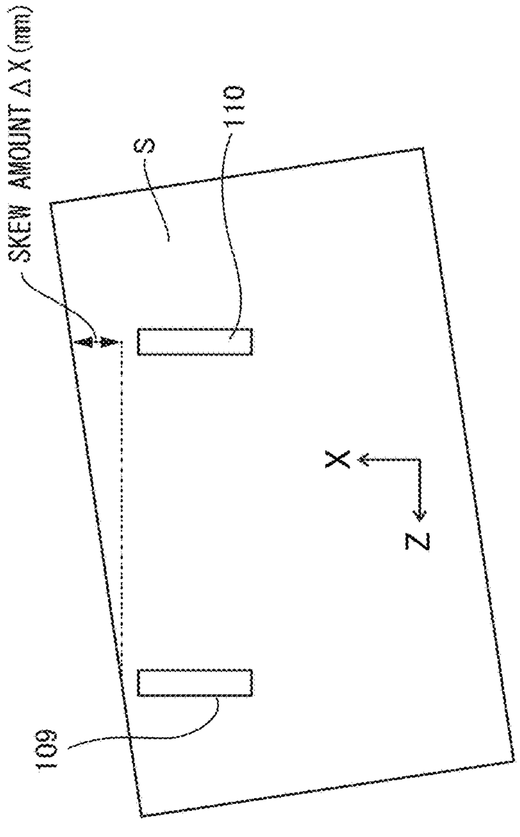
FIGS. 8A to 8E are explanatory diagrams of skew correction according to the first embodiment.

Specifically, as illustrated in FIG. 8A, the controller 50 calculates a skew amount ΔX of the sheet S on the basis of the time difference between the timings at which passage of the leading end of the sheet S is respectively detected by left and right sensors (for example, the first registration sensors 103 and 104) in the skew detection portion, and the conveyance speed of the sheet S. In the illustrated example, the skew amount ΔX is defined as a distance (mm) by which the position of the leading end of the sheet S at the position (Z-direction position) of the left registration roller 109 is behind or ahead of the position of the leading end of the sheet S at the position (Z-direction position) of the right registration roller 110.

Here, a component of the conveyance speed LV of the left registration roller 109 in the sheet conveyance direction (X) will be referred to as an X-direction speed LVx (mm/sec) of the registration roller 109, and a component of the conveyance speed LV in the sheet width direction (Z) will be referred to as a Z-direction speed LVz (mm/sec) of the registration roller 109. Similarly, a component of the conveyance speed RV of the right registration roller 110 in the sheet conveyance direction (X) will be referred to as an X-direction speed RVx (mm/sec) of the registration roller 110, and a component of the conveyance speed RV in the sheet width direction (Z) will be referred to as a Z-direction speed RVz (mm/sec) of the registration roller 110.

Figure 8B:
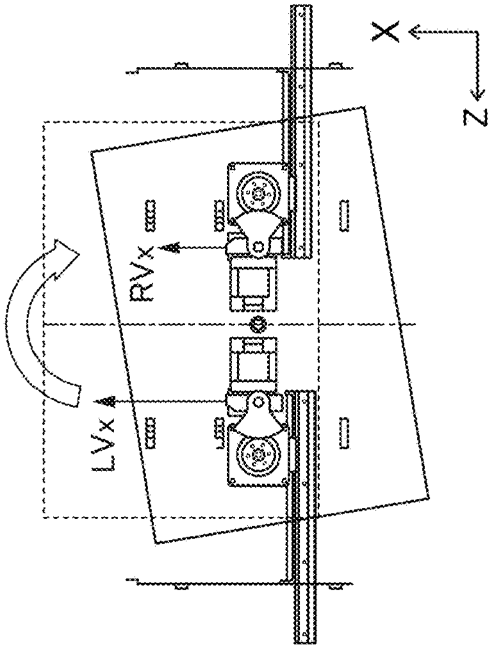

The skew correction profile in the present embodiment is time-series data of the X-direction speeds LVx and RVx of the left and right registration rollers 109 and 110. As illustrated in FIG. 8B, by independently driving the registration rollers 109 and 110 such that there is a difference between the X-direction speeds LVx and RVx of the left and right registration rollers 109 and 110, the skew of the sheet S can be corrected. In the illustrated example, the sheet S is conveyed while pivoting in the clockwise direction in the drawing due to the difference between LVx and RVx, and thus the skew amount ΔX is reduced.

Figure 8C:
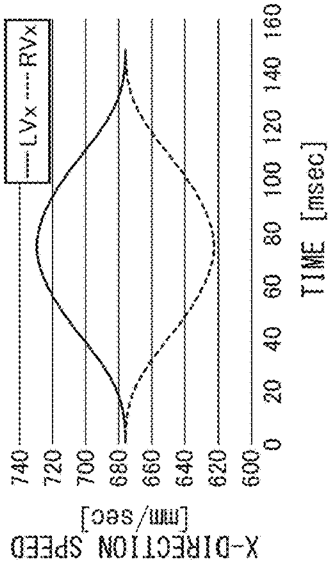
Figure 8D:
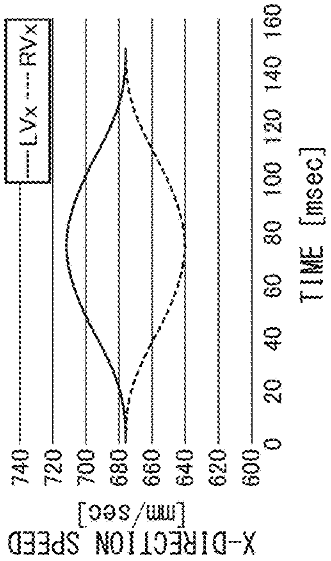
Figure 8E:
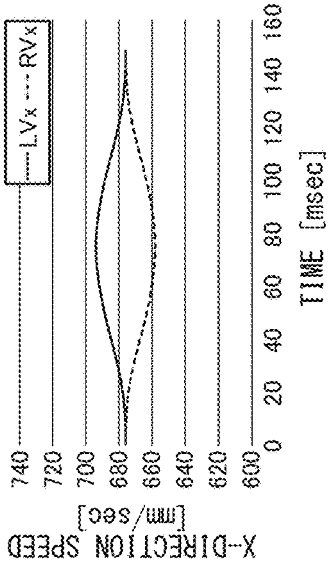

FIGS. 8C to 8E illustrate an example of the skew correction profile. FIG. 8C illustrates a profile example in the case where the skew amount ΔX calculated on the basis of the detection result of the skew detection portion is 15 mm (the left side is 15 mm behind). FIG. 8D illustrates a profile example in the case where the skew amount ΔX is 10 mm, and FIG. 8E illustrates a profile example in the case where the skew amount ΔX is 5 mm.

The skew correction profile is preferably generated such that the integral value of the difference between the X-direction speeds LVx and RVx of the registration rollers 109 and 110 with respect to time is approximately equal to the skew amount ΔX. For example, a reference profile generated in consideration of a case where the skew amount ΔX is equal to a reference amount ΔX0 that is set in advance is prepared in advance. The reference profile is time-series data of differences ΔLVx and ΔRVx of the X-direction speeds LVx and RVx from the process speed (peripheral speed of the printing belt 225). The reference profile is set such that the integral value of the left-right difference (LVx-RVx) between the X-direction speeds LVx and RVx with respect to time is equal to the reference amount ΔX0 (that is, such that the skew of the reference amount ΔX0 is exactly cancelled). Further, by summing up the reference speed with a value obtained by multiplying ΔLVx and ΔRVx of the reference profile by a ratio between the skew amount ΔX and the reference amount ΔX0 calculated on the basis of the detection result of the skew detection portion, a skew correction profile corresponding to the skew amount ΔX can be generated.

Described above is a calculation example of the skew correction profile, and a different calculation method may be used as long as the integral value of the difference between the X-direction speeds LVx and RVx of the registration rollers 109 and 110 with respect to time as a result is approximately equal to the absolute value of the skew amount ΔX. In addition, a skew correction profile in which the graphs of LVx and RVx each draw a smooth curve (that is, the acceleration thereof does not change discontinuously) is illustrated as an example in FIGS. 8C to 8E. The configuration is not limited to this, and a skew correction profile in which the graphs of LVx and RVx are each in a polyline shape (triangular or trapezoidal shape) may be used.

Lateral Deviation Correction

The lateral deviation correction of the sheet S in the registration unit 100 will be described mainly with reference to FIGS. 9A to 9E. As described above, the steering angle of each of the left and right registration rollers 109 and 110 is changed by corresponding one of the steering motors 107 and 108.

Specifically, as illustrated in FIGS. 2 and 3, the left registration roller 109 can pivot about a steering shaft 115 extending in the Y direction, and the right registration roller 110 can pivot about a steering shaft 116 extending in the Y direction. A fan-shaped input gear 111 is attached to each of the steering shafts 115 and 116, and output gears 112 of the steering motors 107 and 108 are engaged with the input gears 111. Therefore, the left and right registration rollers 109 and 110 pivot as a result of the rotation of the steering motors 107 and 108, and thus the steering angles thereof are changed (FIGS. 4B and 4E). To be noted, the conveyance driving motors 105 and 106 also pivot about the steering shafts 115 and 116 together with the corresponding ones of the registration rollers 109 and 110.

The steering motor 107 is an example of a steering portion (first steering portion) that changes the inclination (steering angle) of the rotational axis of the registration roller 109 with respect to the sheet width direction (Z). The steering motor 108 is an example of a steering portion (second steering portion) that changes the inclination (steering angle) of the rotational axis of the registration roller 110 with respect to the sheet width direction (Z). In addition, the steering motors 107 and 108, the input gears 111, the output gears 112, and the steering shafts 115 and 116 constitute a steering mechanism that changes the steering angles of the registration rollers 109 and 110.

Figure 9A:
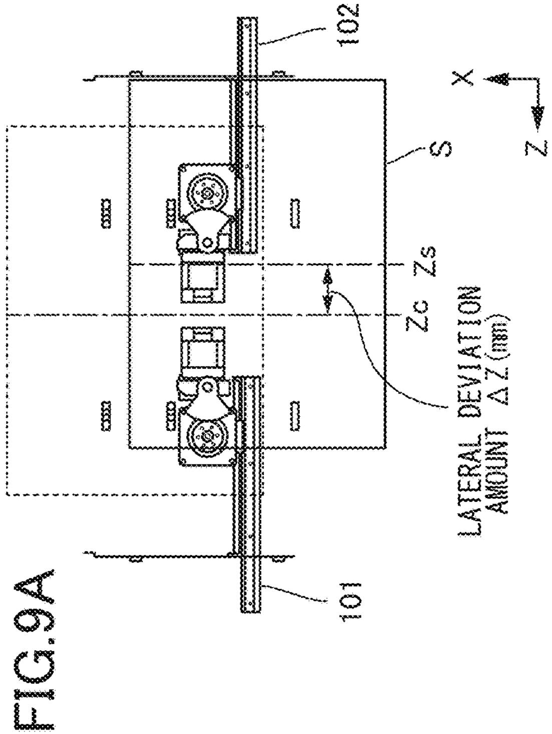
FIGS. 9A to 9E are explanatory diagrams of lateral deviation correction according to the first embodiment.
Figure 9B:
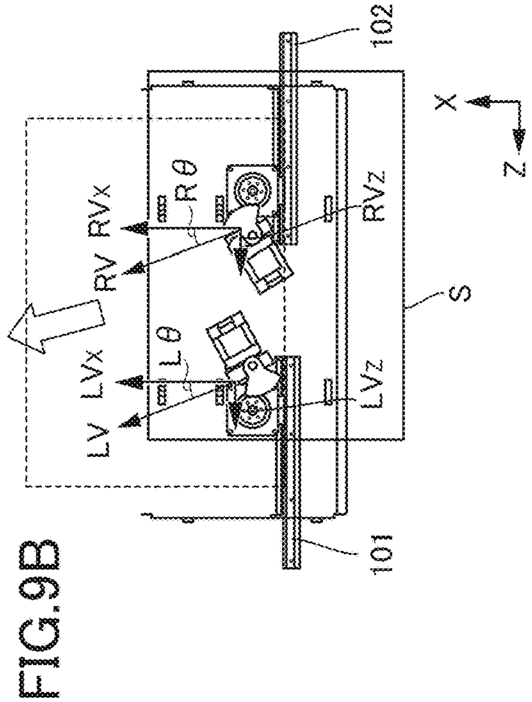

The controller 50 calculates the lateral deviation amount ΔZ of the sheet S on the basis of the position of the sheet S in the sheet width direction (Z) detected by the left and right image sensors 101 and 102 (FIG. 9A). The lateral deviation amount is a deviation amount of the actual position of the sheet S with respect to a target position in the sheet width direction (Z). In the present embodiment, the sheet S is laterally registered on the center basis. That is, the target position in the present embodiment is the center position (hereinafter referred top as a conveyance center Zc) of the conveyance path of the sheet S in the registration unit 100. The lateral deviation amount is a positional deviation amount of the sheet S from the conveyance center Zc in the sheet width direction (Z). Specifically, in the present embodiment, the distance from the conveyance center Zc to a center (hereinafter referred to as a sheet center Zs) between the left and right side ends of the sheet S detected by the image sensors 101 and 102 in the sheet width direction (Z) will be referred to as a lateral deviation amount ΔZ of the sheet S.

The control portion generates a lateral deviation correction profile on the basis of the calculated lateral deviation amount ΔZ. The lateral deviation correction profile in the present embodiment is time-series data of the Z-direction speeds LVz and RVz (FIG. 9B) of the left and right registration rollers 109 and 110.

Figure 9C:
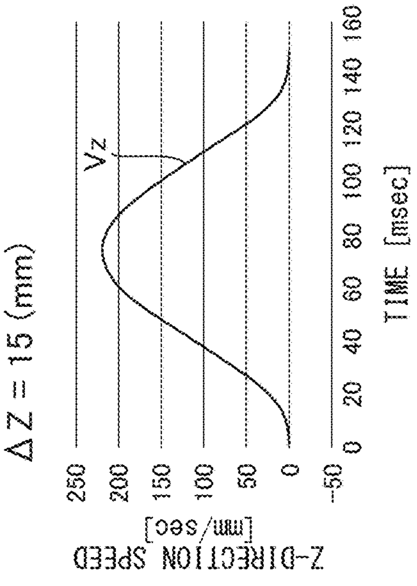
Figure 9D:
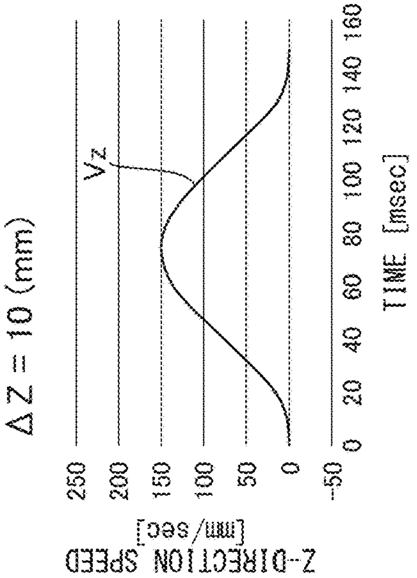
Figure 9E:
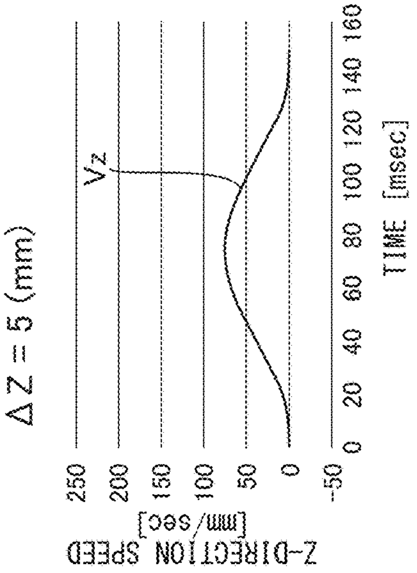

FIGS. 9C to 9E each illustrate an example of the lateral deviation correction profile. FIG. 9C illustrates a profile example in the case where the lateral deviation amount ΔZ calculated on the basis of the detection result of the image sensors 101 and 102 is 15 mm (displaced to the left side by 15 mm). FIG. 9D illustrates a profile example in the case where the lateral deviation amount ΔZ is 10 mm, and FIG. 9E illustrates a profile example in the case where the lateral deviation amount ΔZ is 5 mm.

First, to simplify the description, a case where only the lateral deviation correction is performed without the skew correction will be described. In this case, the conveyance speeds LV and RV of the left and right registration rollers 109 and 110 are equal, and the steering angles of the left and right registration rollers 109 and 110 are always equal (FIGS. 4A and 4C).

The lateral deviation correction profile is preferably generated such that the integral value of the Z-direction speeds LVz and RVz of the registration rollers 109 and 110 with respect to time is approximately equal to the lateral deviation amount ΔZ. For example, a reference profile generated in consideration of a case where the lateral deviation amount ΔZ is equal to a reference amount ΔZ0 is prepared in advance. The reference profile is time-series data of the Z-direction speed Vz. The reference profile is set such that the integral value of the Z-direction speed Vz with respect to time is equal to the reference amount ΔZ0 (that is, such that the lateral deviation of the reference amount ΔZ0 is exactly cancelled). Further, the lateral deviation correction profile corresponding to the lateral deviation amount ΔZ can be generated by using, as the Z-direction speeds LVz and RVz, values obtained by multiplying Vz of the reference profile by the ratio between the reference amount ΔZ0 and the lateral deviation amount ΔZ calculated on the basis of the detection result of the image sensors 101 and 102.

Described above is a calculation example of the lateral deviation correction profile, and a different calculation method may be used as long as the integral value of the Z-direction speeds LVz and RVz of the registration rollers 109 and 110 with respect to time as a result is approximately equal to the absolute value of the lateral deviation amount ΔZ. In addition, a lateral deviation correction profile in which the graphs of LVz and RVz each draw a smooth curve (that is, the acceleration thereof does not change discontinuously) is illustrated as an example in FIGS. 9C to 9E. The configuration is not limited to this, and a lateral deviation correction profile in which the graphs of LVz and RVz are each in a polyline shape (triangular or trapezoidal shape) may be used.

In the case where the lateral deviation correction and the skew correction are not performed simultaneously, the X-direction speeds LVx and RVx of the registration rollers 109 and 110 are preferably equal to the conveyance speed of the printing belt unit 200 positioned downstream of the registration unit 100. The conveyance speed of the printing belt unit 200 is the peripheral speed of the printing belt 225, and is the processing speed (process speed) of the recording process by the recording portion 300.

As described above, in the case of not performing the lateral deviation correction and the skew correction simultaneously, the Z-direction speeds LVz and RVz of the registration rollers 109 and 110 are determined in accordance with the lateral deviation amount ΔZ, and the X-direction speeds LVx and RVx of the registration rollers 109 and 110 are set to be equal to the conveyance speed of the printing belt unit 200. As illustrated in FIG. 9C, the X-direction speed LVx and the Z-direction speed LVz can be converted into a steering angle Lθ and a conveyance speed LV of the left registration roller 109 by using trigonometric functions. In addition, the X-direction speed RVx and the Z-direction speed RVz can be converted into a steering angle Rθ and a conveyance speed RV of the right registration roller 110 by using trigonometric functions.

Figure 10A:
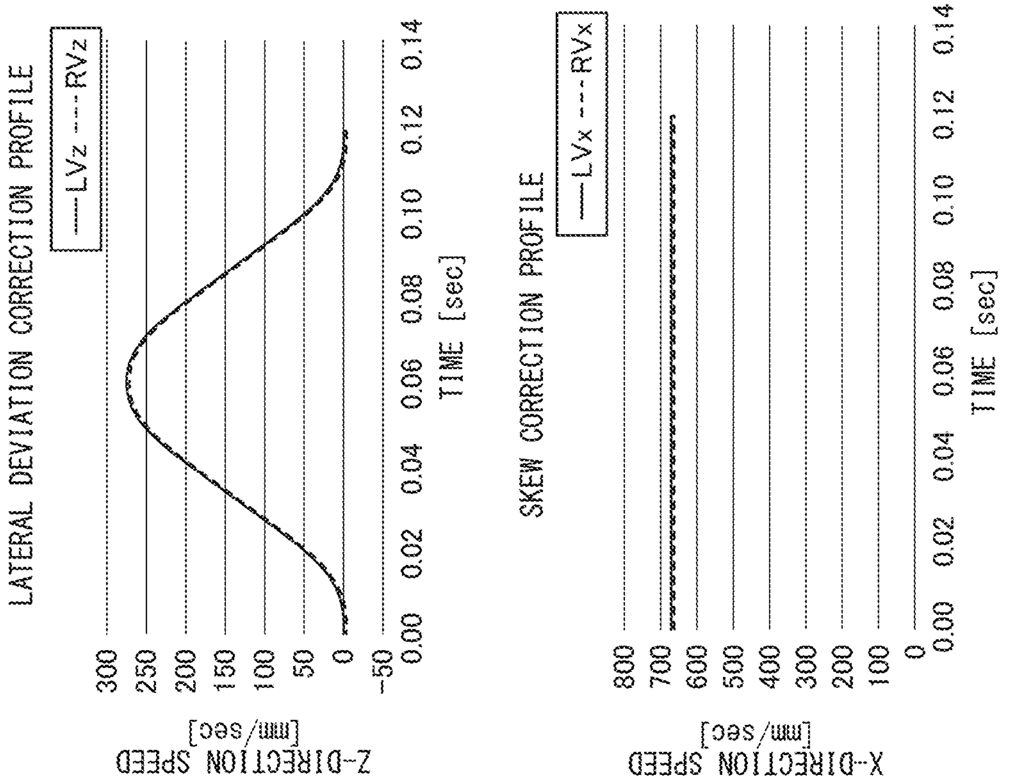
FIGS. 10A and 10B are explanatory diagrams of lateral deviation correction according to the first embodiment.
Figure 10B:
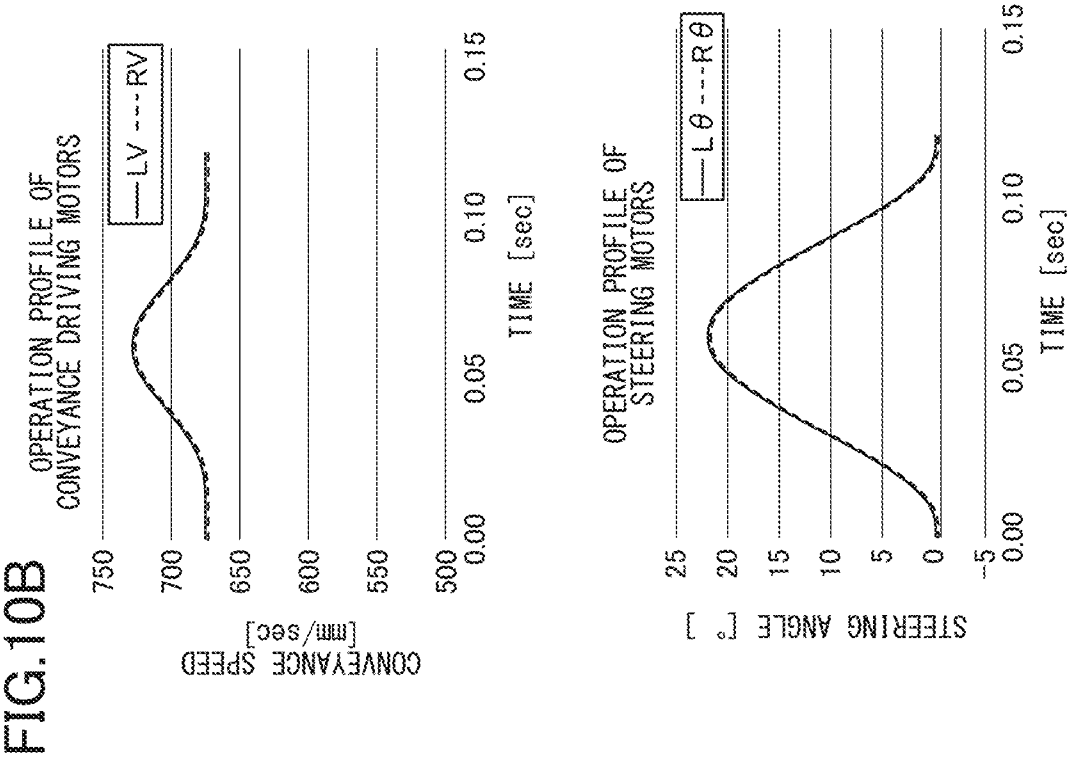

In the case where the Z-direction speeds LVz and RVz and the X-direction speeds LVx and RVx (FIG. 10A) per unit time are converted into the steering angles Lθ and Rθ and the conveyance speeds LV and RV, time-series data of the steering angles Lθ and Rθ and the conveyance speeds LV and RV (FIG. 10B) can be obtained. The upper half of FIG. 10B illustrates time-series data of the conveyance speeds LV and RV of the registration rollers 109 and 110, that is, the operation profile of the conveyance driving motors 105 and 106. The lower half of FIG. 10B illustrates time-series data of the steering angles Lθ and Rθ of the registration rollers 109 and 110, that is, the operation profile of the steering motors 107 and 108. In the case where the lateral deviation amount ΔZ is given, the lateral deviation of the sheet S can be corrected by operating the conveyance driving motors 105 and 106 and the steering motors 107 and 108 in accordance with these operation profiles.

Simultaneous Correction of Skew and Lateral Deviation

Although the skew correction and the lateral deviation correction are separately described in the description above, the registration unit 100 can simultaneously execute the skew correction and the lateral deviation correction by using the registration rollers 109 and 110. That is, the controller 50 can simultaneously execute control (active registration) of correcting the skew of the sheet S by mainly controlling the speed difference between the registration rollers 109 and 110 and control (steering operation) of correcting the lateral deviation of the sheet S by mainly controlling the inclination angles of the registration rollers 109 and 110. To be noted, "simultaneously" correcting the skew and the lateral deviation refers to a case where a period in which the sheet S is pivoted for the skew correction and a period in which the sheet S is moved in the sheet width direction for the lateral deviation correction overlap with each other at least partially.

Figure 11A:
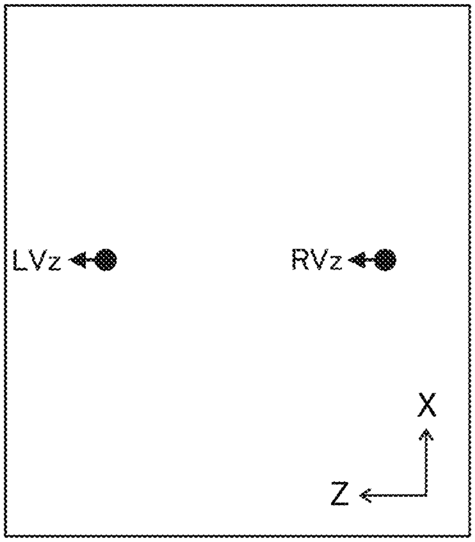
FIGS. 11A to 11D are conceptual diagrams of control in which skew correction and lateral deviation correction according to the first embodiment are performed simultaneously.
Figure 11B:
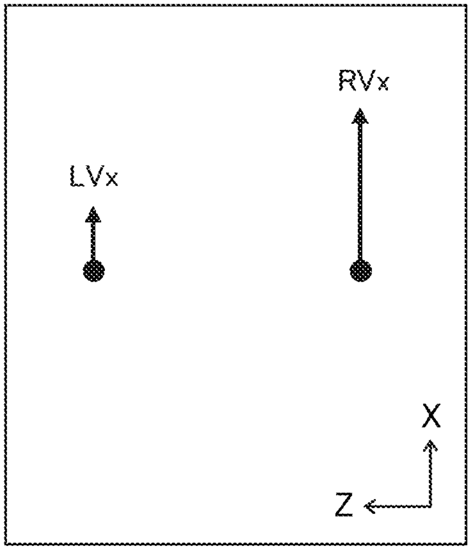

FIGS. 11A to 11D are conceptual diagrams of the control of simultaneously performing the skew correction and the lateral deviation correction. As described in the description of the lateral deviation correction, the Z-direction speeds LVz and RVz of the registration rollers 109 and 110 per unit time are determined as the lateral deviation correction profile in the case where the lateral deviation amount ΔZ is given (FIG. 11A). In addition, as described in the description of the skew correction, the X-direction speeds LVx and RVx of the registration rollers 109 and 110 per unit time are determined as the skew correction profile in the case where the skew amount ΔX is given (FIG. 11B).

It can be said that the Z-direction speeds LVz and RVz of FIG. 11A represent the Z-direction components of the vectors of the conveyance forces to be applied to the sheet S by the registration rollers 109 and 110 (vectors determined from the steering angles Lθ and Rθ and the conveyance speeds LV and RV). In addition, it can be said that the X-direction speeds LVx and RVx of FIG. 11B represent the X-direction components of the vectors of the conveyance forces to be applied to the sheet S by the registration rollers 109 and 110. When the Z-direction speeds LVz and RVz are combined with the X-direction speeds LVx and RVx for each unit time, the vectors (LVx, LVz) and (RVx, RVz) of the conveyance forces to be applied to the sheet S by the left and right registration rollers 109 and 110 can be obtained for each time point. The time-series data of the steering angles Lθ and Rθ and the conveyance speeds LV and RV can be obtained by converting these vectors (LVx, LVz) and (RVx, RVz) of the orthogonal coordinate system into vectors (LV, Lθ) and (RV, Rθ) of the polar coordinate system (FIG. 11D).

Figure 11C:
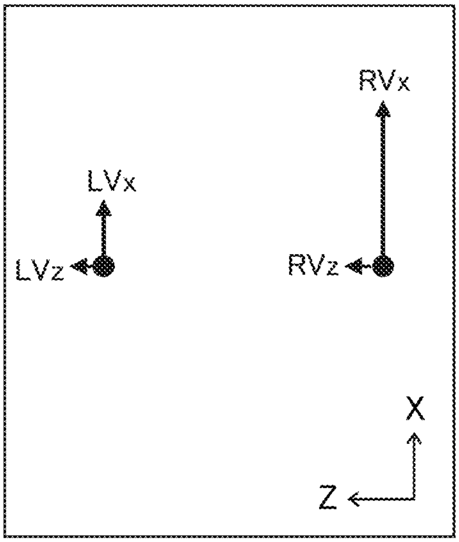
Figure 11D:
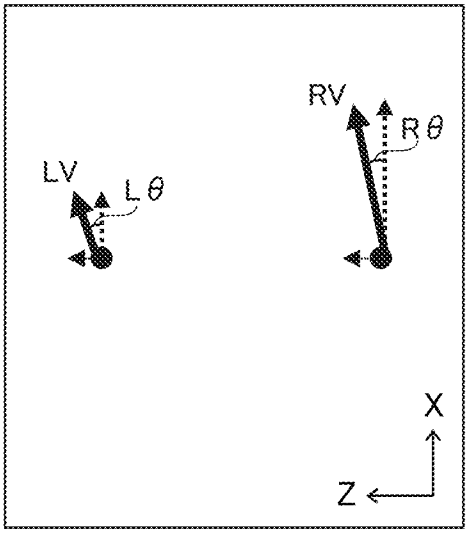
Figure 12A:
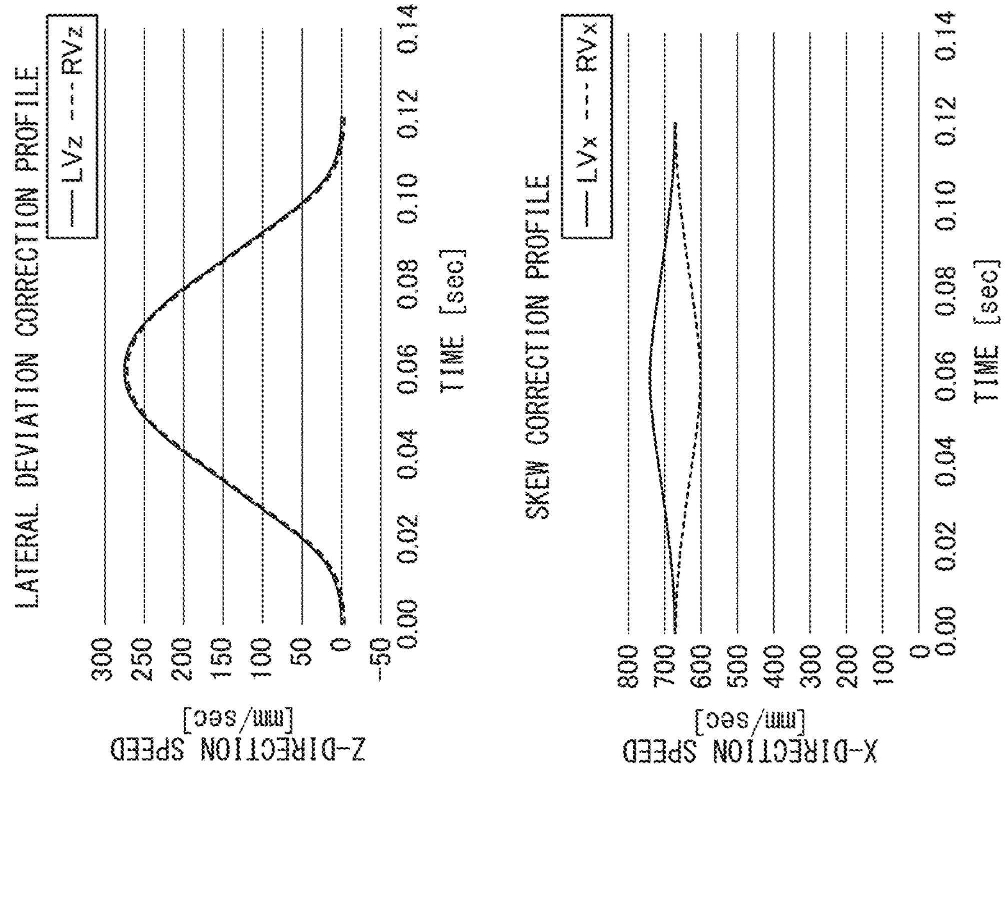
FIGS. 12A and 12B are explanatory diagrams of control in which skew correction and lateral deviation correction according to the first embodiment are performed simultaneously.
Figure 12B:
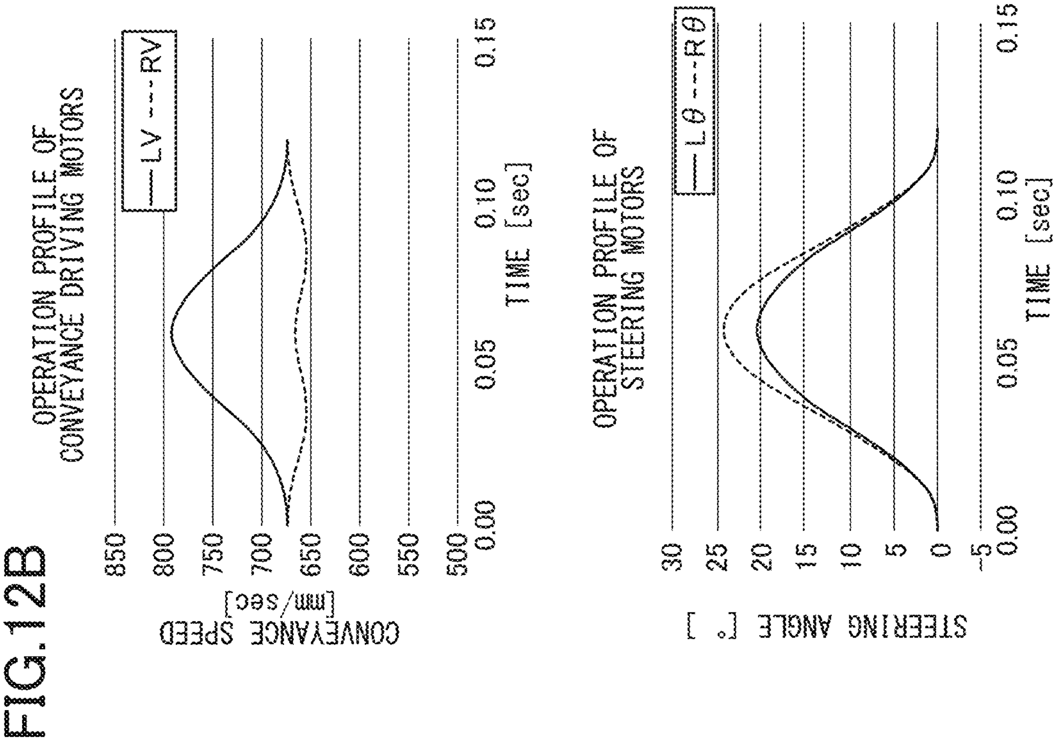

FIG. 12A illustrates a profile in which the Z-direction speeds LVz and RVz and X-direction speeds LVx and RVx of FIG. 11C are illustrated in time-series. FIG. 12B illustrates a profile obtained by converting FIG. 12A into the steering angles Lθ and Rθ and the conveyance speeds LV and RV. The upper half of FIG. 12B illustrates time-series data of the conveyance speeds LV and RV of the registration rollers 109 and 110, that is, the operation profile of the conveyance driving motors 105 and 106. The lower half of FIG. 12B illustrates time-series data of the steering angles Lθ and Rθ of the registration rollers 109 and 110, that is, the operation profile of the steering motors 107 and 108.

The controller 50 generates the operation profiles of the conveyance driving motors 105 and 106 and the steering motors 107 and 108 on the basis of the lateral deviation amount ΔZ and the skew amount ΔX by performing the processing described above. Further, the controller 50 can simultaneously correct the skew and lateral deviation of the sheet S by controlling the operation of the conveyance driving motors 105 and 106 and the steering motors 107 and 108 in accordance with the generated operation profiles.

Contact Separation Configuration of Caster Rollers

Configuration related to contact and separation of the caster rollers 120 and 121 will be described. FIG. 6A is a diagram illustrating the left caster roller 120 and a contact/separation mechanism 140 as viewed in the sheet width direction (Z). FIG. 6B is a diagram illustrating the caster roller 120 and the contact/separation mechanism 140 as viewed in the Y direction.

As illustrated in FIGS. 6A and 6B, the caster roller 120 includes a rotation shaft 120*c*, a roller body 120*a* that rotates about the rotation shaft 120*c*, a base portion 120*b* that supports the rotation shaft 120*c*, and a caster shaft 120*d*. The base portion 120*b* and the caster shaft 120*d* are a support member that supports the caster roller 120 (follower roller) and includes a shaft portion (caster shaft 120*d*) extending along a pivot axis of the caster roller 120.

The caster roller 120 is held by a roller holder 135 (holding member). The caster shaft 120*d* of the caster roller 120 is inserted in a hole 135*a* of the roller holder 135, and is configured to be rotatable (pivotable) with respect to the roller holder 135. That is, the caster roller 120 is pivotable about a pivot axis with respect to the roller holder 135 with the center line of the caster shaft 120*d* as the pivot axis.

The caster roller 120 is urged toward a position where the pivot angle is 0° by an auxiliary spring 139. That is, the auxiliary spring 139 functions as an urging member that urges the support member (base portion 120*b*) to reduce the inclination angle of the rotational axis of the caster roller 120 (follower roller) with respect to the sheet width direction (Z) toward 0. In a state in which the pivot angle is 0°, the movement direction of the peripheral surface of the caster roller 120 at the nip portion between the registration roller 109 and the caster roller 120 is parallel to the sheet conveyance direction (X) (is directed in the straight movement direction of the sheet S). The auxiliary spring 139 is attached or coupled to a spring hooking portion 120*e* provided on the base portion 120*b* of the caster roller 120, and a spring hooking portion 135*f* provided on the roller holder 135.

The auxiliary spring 139 has a function of making the pivot angle of the caster roller 120 more likely to return to 0°, reducing the vibration of the caster roller 120 in the pivot direction, and thus accelerating the settlement of the vibration. However, the spring force of the auxiliary spring 139 is set to be sufficiently small so as not to affect the skew correction and lateral deviation correction of the registration unit 100.

The pivot angle sensors 133 and 134 are each attached to a sensor attachment portion 135*e* of the roller holder 135. The pivot angle sensors 133 and 134 detect the rotation angles of the caster shafts 120*d* as the pivot angle of the caster rollers 120 and 121. The pivot angle sensors 133 and 134 are examples of vibration detection portions configured to detect the vibration of the caster rollers 120 and 121 in the pivot direction. The pivot angle sensors 133 and 134 are, for example, each a rotary encoder that detects the rotational phase of a disk integrally rotating with the caster shaft 120*d*.

The contact/separation mechanism 140 includes the roller holder 135, the separation motor 138, a separation cam 137, a cam follower 136, and pressurizing springs 141. The contact/separation mechanism 140 switches the registration roller 109 (driving roller) and the caster roller 120 (follower roller) between a contact state in which the registration roller 109 and the caster roller 120 are in contact with each other and a separation state in which the registration roller 109 and the caster roller 120 are separated from each other.

The roller holder 135 is swingable about a swing shaft 135*c*. The pressurizing spring 141 pressurizes a pressurizing portion 135*g* of the roller holder 135, and thus urges the roller holder 135 in such a direction that the caster roller 120 approaches the registration roller 109.

The cam follower 136 is rotatably supported by a shaft portion 135*d* provided in the roller holder 135. The cam follower 136 is disposed on one end side with respect to the swing shaft 135*c*, and the caster shaft 120*d* of the caster roller 120 and the pressurizing spring 141 are disposed on the other end side with respect to the swing shaft 135*c*.

The separation cam 137 rotates by receiving transmission of a driving force from the separation motor 138. When the separation cam 137 presses the cam follower 136, the roller holder 135 swings in the clockwise direction of FIG. 6A against the urging force of the pressurizing spring 141, and the caster roller 120 is separated from the registration roller 109. That is, the registration roller 109 and the caster roller 120 takes a separation state in which the registration roller 109 and the caster roller 120 are separated from each other. When the pressing of the cam follower 136 by the separation cam 137 is cancelled, the roller holder 135 swings in the counterclockwise direction of FIG. 6A by the urging force of the pressurizing spring 141, and the caster roller 120 comes into contact with the registration roller 109. That is, the registration roller 109 and the caster roller 120 take a contact state (nipping state) in which the registration roller 109 and the caster roller 120 are in contact with each other.

To be noted, the right caster roller 121 is supported by the roller holder 135 similarly to the left caster roller 120. Therefore, when the roller holder 135 swings in accordance with the rotation angle of the cam follower 136, the left and right caster rollers 120 and 121 both come into contact with or out of contact from the registration rollers 109 and 110. That is, the separation motor 138 of the present embodiment is a common drive source (actuator) for switching the left and right registration roller pairs between the contact state and the separation state. To be noted, a drive source (actuator) for bringing the right registration roller 110 and the caster roller 121 into contact with and out of contact from each other may be provided additionally to the separation motor 138.

To be noted, instead of a configuration in which the caster rollers 120 and 121 are moved to come into contact with and out of contact from the registration rollers 109 and 110, a configuration in which the registration rollers 109 and 110 are moved to come into contact with and out of contact from the caster rollers 120 and 121 may be employed. In addition, the mechanism for bringing the registration roller pairs into contact and out of contact is not limited to one using a motor and a cam, and for example, the roller holder 135 may be moved by a solenoid.

After the skew correction and lateral deviation correction are performed by the registration unit 100, the sheet S is further conveyed by the printing belt unit 200. Here, after the sheet S is attracted to the printing belt 225 by suction, the caster rollers 120 and 121 are separated from the registration rollers 109 and 110. As a result of this, the sheet S is conveyed without receiving conveyance resistance from the registration rollers 109 and 110, and therefore an image can be formed on the sheet S by the recording portion 300 with high precision.

Control Example

Figure 13:
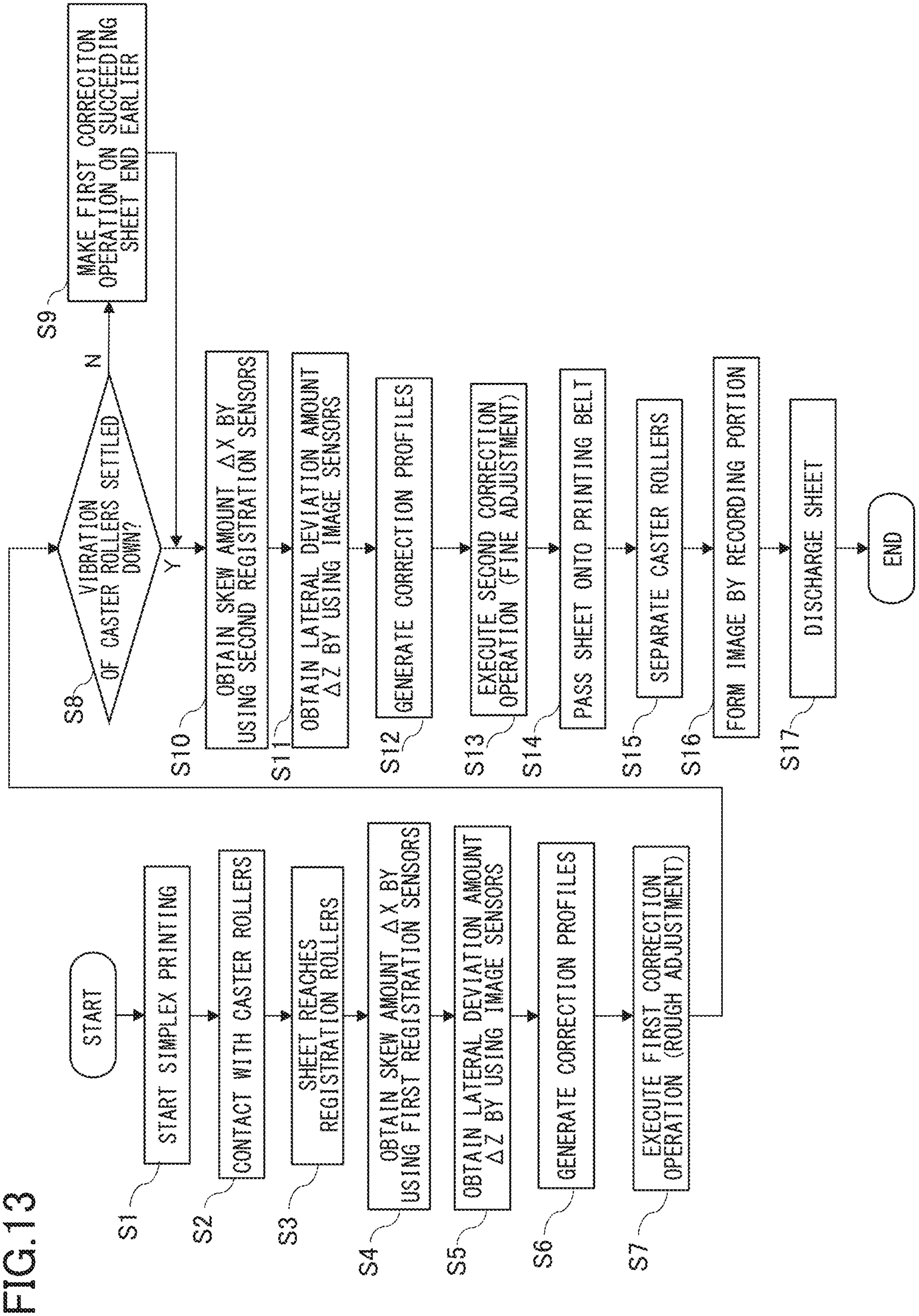
FIG. 13 is a flowchart illustrating a control example according to the first embodiment.
Figure 14:
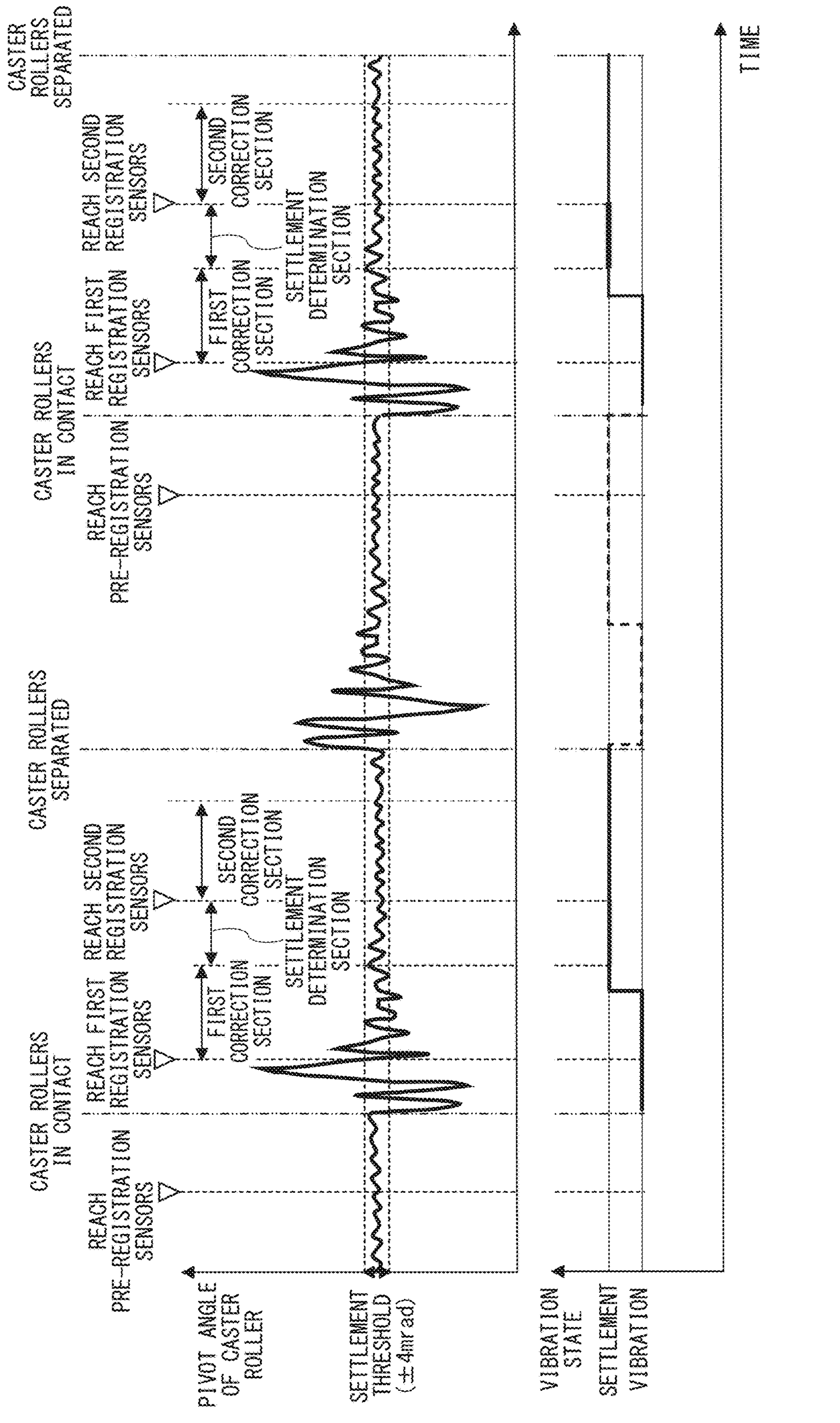
FIG. 14 is a diagram illustrating a transition example of change in a pivot angle of the caster roller according to the first embodiment.

Control including the skew correction and lateral deviation correction by the registration unit 100 will be described with reference to FIGS. 13 and 14. FIG. 13 is a flowchart illustrating an execution procedure of a print job by the ink jet recording apparatus 1, particularly focusing on the operation of the registration unit 100. The upper half of FIG. 14 illustrates an example of a detection result of the pivot angles of the caster rollers 120 and 121 by the pivot angle sensors 133 and 134. The lower half of FIG. 14 illustrates a determination result of vibration in the pivot direction of the caster rollers 120 and 121.

Here, the procedure of a print job (simplex print job) in which an image is formed on only one surface (first surface) of the sheet S will be described. The image forming operation is a series of operations in which the ink jet recording apparatus 1 serving as an image forming apparatus forms an image on the sheet S while conveying one sheet S. The print job is a series of tasks including at least the image forming operation on one sheet S. Each step of the flowchart is executed by the controller 50.

In S1, the controller 50 starts the simplex print job when receiving an execution instruction (print job) of the image forming operation. The controller 50 receives the print job by operation (for example, a press on a print execution button) of the operation portion 202 by the user, or from the external computer 201 connected to the controller 50 directly or via a network. The print job received by the controller 50 includes setting information (job information) such as the number of copies to be printed and a size of the sheet S used for the printing designated by the user. The controller 50 analyzes the received print job, and executes the image forming operation in accordance with the job information.

To be noted, processing of S2 to S17 below is performed in parallel on each sheet S with time intervals during execution of the print job of successively forming images on a plurality of sheets S. In the description below, a series of processing (S2 to S17) on one sheet S (current sheet) in the print job will be described. The sheet S fed after the current sheet in the print job will be referred to as a succeeding sheet. Particularly, the sheet S fed next after the current sheet in the print job may be referred to as a next sheet.

In S2, the controller 50 rotates the separation motor 138 to bring the caster rollers 120 and 121 separated from the registration rollers 109 and 110 into contact with the registration rollers 109 and 110, and thus prepares for a correction operation using the registration rollers 109 and 110. In addition, the controller 50 rotates the feeding motor 54 to feed the sheet S of a size designated in the job information from the feeding module 1000. The controller 50 can detect the arrival of the sheet S at the registration unit 100 on the basis of, for example, the detection result of the pre-registration sensors 131 and 132 or the detection result of a sheet sensor disposed in the feeding module 1000. The controller 50 starts rotational driving of the registration rollers 109 and 110 and the conveyance roller pairs 118 and 119 positioned upstream thereof, and causes the conveyance roller pairs 118 and 119 to convey the sheet S toward the registration roller pairs.

In S3, the sheet S reaches the registration rollers 109 and 110. The controller 50 can detect arrival of the sheet S at the registration rollers 109 and 110 on the basis of the detection of the leading end of the sheet S by the first registration sensors 103 and 104.

In S4, the controller 50 obtains the skew amount ΔX of the sheet S on the basis of the detection result of the first registration sensors 103 and 104. Specifically, the controller 50 calculates the skew amount ΔX of the sheet S on the basis of the time difference between timings at which the left and right first registration sensors 103 and 104 have detected the leading end of the sheet S and the sheet conveyance speeds of the conveyance roller pairs 118 and 119.

To be noted, a first correction operation (S7) that will be described later may be performed on the succeeding sheet S on the basis of the detection result of the pre-registration sensors 131 and 132 in the case where the skew amount ΔX of the current sheet S is equal to or larger than a predetermined amount. In the case where the skew detection portion whose detection result is used for skew correction is switched to a more upstream one among a plurality of skew detection portions, the conveyance section (section in the conveyance path or temporal section corresponding thereto) in which the correction operation can be executed becomes longer, and thus a larger skew amount can be more easily addressed.

In S5, the controller 50 obtains the lateral deviation amount ΔZ of the sheet S on the basis of the detection result of the image sensors 101 and 102. As described above, the lateral deviation amount ΔZ of the sheet S in the present embodiment is a deviation amount of the sheet center from the conveyance center. The controller 50 detects (edge detection) to which part the sheet S covers the reading range of the image sensors 101 and 102, obtains the sheet center on the basis of the detection result, and thus calculates the lateral deviation amount ΔZ of the sheet S.

In S6, the controller 50 generates operation profiles (collectively referred to as correction profiles) of the conveyance driving motors 105 and 106 and the steering motors 107 and 108 on the basis of the skew amount ΔX and the lateral deviation amount ΔZ obtained in S4 and S5. That is, the controller 50 generates a skew correction profile (time-series data of X-direction speeds LVx and RVx) on the basis of the skew amount ΔX calculated in S4. In addition, the controller 50 generates a lateral deviation correction profile (time-series data of Z-direction speeds LVz and RVz) on the basis of the lateral deviation amount ΔZ calculated in S5. Then, the controller 50 converts the X-direction speeds LVx and RVx and the Z-direction speeds LVz and RVz into the steering angles Lθ and Rθ and the conveyance speeds LV and RV. As a result of this, the controller 50 determines the operation profile of the steering motors 107 and 108 as a time-series data of the steering angles Lθ and Rθ and the operation profile of the conveyance driving motors 105 and 106 as time-series data of the conveyance speeds LV and RV.

In S7, the controller 50 executes the first correction operation (correction operation of the first time) by controlling the operation of the conveyance driving motors 105 and 106 and the steering motors 107 and 108 in accordance with the operation profiles generated in S6. As a result of this, the skew and lateral deviation of the sheet S are roughly adjusted. The first correction operation is performed in a conveyance section (referred to as a first correction section 124, see FIGS. 2 and 3) from the first registration sensors 103 and 104 to the second registration sensors 122 and 123 on the basis of the leading end of the sheet S.

In S8, the controller 50 monitors the vibration of the caster rollers 120 and 121 in the pivot direction by using the pivot angle sensors 133 and 134. That is, the controller 50 monitors the change in the pivot angles of the caster rollers 120 and 121 in a predetermined period (settlement determination section) after the end of the first correction section 124 as illustrated in FIG. 14. The graph in the upper half of FIG. 14 illustrates the change in values ΔLθ and ΔRθ obtained by subtracting the steering angles Lθ and Rθ of the registration rollers 109 and 110 from the pivot angles of the caster rollers 120 and 121 detected by the pivot angle sensors 133 and 134.

The controller 50 determines that the vibration of the caster rollers 120 and 121 has settled down in the case where the deviation (ΔLθ and ΔRθ) of the pivot angles of the caster rollers 120 and 121 from the steering angles Lθ and Rθ is within a predetermined range throughout the settlement determination section. The predetermined range is a range where the absolute value of the deviation (ΔLθ and ΔRθ) of the pivot angle is equal to or smaller than a preset threshold value. The predetermined range is set to, for example, ±4 mrad (about ±0.2°). The predetermined range is not limited to this, and may be set to, for example, ±2 mrad (about ±0.1°), or a range wider than ±4 mrad. The lower half of FIG. 14 schematically illustrates a period (vibration) in which the amount of change (ΔLθ and ΔRθ) in the pivot angle is larger than the threshold value, and a period (settlement) in which the amount of change (ΔLθ and ΔRθ) in the pivot angle is equal to or smaller than the threshold value.

In the case (S8Y) where it is determined that the vibration of the caster rollers 120 and 121 has settled down in S8, the controller 50 proceeds to S10. In contrast, in the case (S8N) where it is determined that the vibration of the caster rollers 120 and 121 has not settled down in S8, the controller 50 proceeds to S9.

In S9, the controller 50 changes the execution conditions of the first correction operation such that the vibration of the caster rollers 120 and 121 in the succeeding sheet settles down more quickly. That is, it is assumed that the vibration of the caster rollers 120 and 121 does not settle down before a predetermined timing before the start of the second correction operation after the first correction operation is performed on the current sheet S (S8N). In this case, the controller 50 executes processing (S9) of changing the execution conditions of the first correction operation such that the end timing of the first correction operation on the succeeding sheet becomes earlier. That is, the controller 50 executes feedback processing (S9) of changing the execution conditions of the first correction operation such that the vibration of the caster rollers 120 and 121 settles down more quickly. The feedback processing of S9 is an example of a predetermined process for causing a correction operation (second correction operation) on the succeeding sheet later than the current sheet to be started after the vibration of the caster roller 120 in the pivot direction has settled down within a predetermined range.

Specifically, the controller 50 gives feedback to generation (S6) of the operation profiles for the first correction operation on the succeeding sheet such that the driving control period of each motor (105 to 108) in the first correction section 124 for the succeeding sheet ends earlier.

The driving control period of the conveyance driving motors 105 and 106 is a period in which a conveyance speed difference is generated between the left and right registration rollers 109 and 110 (period in which the conveyance speeds LV and RV deviate from the process speed). In other words, by executing a predetermined process, the controller 50 shortens the period in which a conveyance speed difference is generated between the left registration roller 109 (first driving roller) and the right registration roller 110 (second driving roller) in the first correction operation (S7).

The driving control period of the steering motors 107 and 108 is a period in which the steering angles Lθ and Rθ are set to values different from 0°, that is, a period in which the rotational axes of the registration rollers 109 and 110 are inclined by the steering motors 107 and 108. In other words, by executing a predetermined process, the controller 50 shortens the period in which the rotational axes of the registration rollers 109 and 110 (driving rollers) are inclined by the steering motors 107 and 108 (steering portion) in the first correction operation (S7).

In the feedback process, to shorten the driving control period of each motor, for example, the reference profile of the skew correction profile or the lateral deviation correction profile is compressed in the time axis direction (correction amounts of LVx, RVx, LVz, and RVz are increased in response to this).

In addition, in the feedback process (S9), for example, the start of the first correction operation is made earlier by changing the skew detection portion to be used for the first correction operation from the first registration sensors 103 and 104 to the pre-registration sensors 131 and 132. In other words, by executing the predetermined process, the controller 50 changes the detection portion whose detection result is to be used for the first correction operation (S7) from the first registration sensors 103 and 104 (third detection portion) to the pre-registration sensors 131 and 132 (fourth detection portion).

The feedback processes described above each may be executed alone, or may be executed in combination.

In S10, the controller 50 obtains the skew amount ΔX of the sheet S again on the basis of the detection result of the second registration sensors 122 and 123. The skew amount ΔX obtained in S10 is the skew amount ΔX corrected by the first correction operation. In addition, as a result of the feedback control of S9, the skew amount ΔX after the vibration of the caster rollers 120 and 121 in the pivot direction has settled down is normally obtained in S10.

In S11, the controller 50 obtains the lateral deviation amount ΔZ of the sheet S again on the basis of the detection result of the image sensors 101 and 102.

In S12, the controller 50 generates the operation profiles of the conveyance driving motors 105 and 106 and the steering motors 107 and 108 on the basis of the skew amount ΔX and the lateral deviation amount ΔZ obtained in S10 and S11. In the present embodiment, the method for generating the operation profiles for the second correction operation is the same as the method for generating the operation profiles for the first correction operation (S6).

In S13, the controller 50 executes the second correction operation (correction operation for the second time) by controlling the operation of the conveyance driving motors 105 and 106 and the steering motors 107 and 108 in accordance with the operation profiles generated in S12. As a result of this, the skew and lateral deviation of the sheet S are finely adjusted. The second correction operation is performed in a conveyance section (referred to as a second correction section 125, see FIGS. 2 and 3) from the second registration sensors 122 and 123 to the printing belt 225 on the basis of the leading end of the sheet S.

In S14, the sheet S is passed from the registration rollers 109 and 110 to the printing belt 225. In S15, the controller 50 rotates the separation motor 138, and thus separates the caster rollers 120 and 121 from the registration rollers 109 and 110. That is, the controller 50 switches the registration roller pairs from the contact state to the separation state after the leading end of the sheet S has reached the printing belt 225 that is a conveyance member positioned downstream of the registration roller pairs. In the present embodiment, the controller 50 changes the registration roller pairs from the contact state to the separation state before the trailing end of the sheet S passes the registration roller pairs.

In S16, the controller 50 causes the recording portion 300 to start a recording process. To be noted, the separation (S15) of the caster rollers 120 and 121 may be after the start (S16) of the recording process. In S17, the controller 50 causes the sheet S on which an image has been formed to be discharged onto the stacking portion 7500 of the stacking module 7000, and finishes the print job.

To be noted, in the case of an image forming operation (duplex printing) in which an image is formed on each surface of the sheet S, the controller 50 causes the sheet S on a first surface of which an image has been formed to be conveyed to the duplex conveyance path after S16. The controller 50 causes the sheet S to be reversed at the reversing portion 4200 and then conveyed toward the registration unit 100 again. Then, the controller 50 executes the process of S2 and later steps on the reversed sheet S, and thus forms an image on the second surface of the sheet S.

Summary of Present Embodiment

The image forming apparatus of the present embodiment includes a driving roller whose inclination of the rotational axis is changeable and a follower roller pivotable by following the driving roller as a mechanism for correcting the positional deviation (including skew that is a positional deviation in the rotational direction) of the sheet, and the driving roller and the follower roller are configured to come into contact with and out of contact from each other. In such an image forming apparatus, there is a possibility that the correction precision of the positional deviation deteriorates as a result of occurrence of vibration of the follower roller in the pivot direction when the driving roller and the follower roller are brought into contact with each other.

The controller 50 of the present embodiment executes, on the basis of the detection result of the pivot angle sensors 133 and 134, the feedback process (S9) for starting the second correction operation at least after the vibration of the caster rollers 120 and 121 has settled down for the succeeding sheet. In other words, the control portion executes, on the basis of the detection result of the first detection portion, a predetermined process for causing a correction operation to be started after the driving roller and the follower roller have been switched from the separation state to the contact state and after the vibration of the follower roller in the pivot direction has settled down within a predetermined range. Therefore, the influence, on the correction operation, of the vibration of the follower roller in the pivot direction that occurs when the driving roller and the follower roller are brought into contact with each other can be reduced.

That is, according to the present embodiment, a sheet conveyance apparatus and an image forming apparatus capable of improving the correction precision of the positional deviation of the sheet can be provided.

In addition, in the present embodiment, the detection (S10 and S11) of the skew amount and the lateral deviation amount for the second correction operation is also performed after the vibration of the caster rollers 120 and 121 has settled down. In other words, the control portion executes the correction operation on the basis of the detection result of detection of the positional deviation of the sheet by the second detection portion after the vibration of the follower roller has settled down. Therefore, a possibility in which an error occurs in the detection result of the skew amount and the lateral deviation amount due to instability of the position of the sheet S caused by the vibration of the follower roller and the correction precision of the positional deviation of the sheet deteriorates as a result can be reduced.

In addition, the controller 50 of the present embodiment executes the first correction operation (S7) before the second correction operation (S13) by using the registration rollers 109 and 110 and the caster roller 120 and 121. The controller 50 starts the first correction operation (S7) after the registration rollers 109 and 110 and the caster rollers 120 and 121 have been switched from the separation state to the contact state and before the vibration of the caster rollers 120 and 121 in the pivot direction settles down. That is, whereas the fine adjustment (second correction operation) in which the influence of the vibration of the caster rollers 120 and 121 is more likely to be exhibited is performed after the vibration has settled down, rough adjustment (first correction operation) in which the influence of the vibration is less likely to be exhibited is started without waiting for the vibration to settle down. Therefore, the productivity can be improved while maintaining the correction precision of the positional deviation of the sheet as compared with, for example, a configuration in which the first correction operation is started after the vibration of the caster rollers 120 and 121 has settled down.

In addition, in the present embodiment, the position of the sheet is roughly and finely adjusted by executing two correction operations (S7 and S13) by one correction portion (registration rollers 109 and 110). Therefore, the size of the apparatus can be reduced as compared with a configuration in which the sheet position is roughly adjusted by a first correction portion and then is finely adjusted by a second correction portion different from the first correction portion.

In addition, in the present embodiment, the skew of the sheet S can be corrected without performing skew correction of a system (stop registration) in which the leading end of the sheet is caused to abut a nip portion of a registration roller pair or a shutter. In addition, in the present embodiment, the skew of the sheet S can be corrected without performing lateral deviation correction of a system in which the roller pair nipping the sheet S is slid (shifted) in the sheet width direction. Therefore, a waiting time for stopping the leading end of the sheet or returning the slide mechanism (shift mechanism) of the roller pair to a home position is not necessary, which is advantageous in terms of improvement in the productivity.

Modification Example

In the present embodiment, an example in which the vibration in the pivot direction of the left and right caster rollers 120 and 121 is respectively monitored by using the pivot angle sensors 133 and 134 has been described. The configuration is not limited to this, and for example, the control described with reference to FIG. 13 may be applied by monitoring only one of the left and right caster rollers 120 and 121. Since it can be considered that the left and right caster rollers 120 and 121 take about the same time to settle down the vibration thereof, the productivity can be improved also in the present modification example while maintaining the correction precision of the positional deviation of the sheet.

Second Embodiment

A second embodiment will be described. The present embodiment is different from the first embodiment in some of the details of the control of the print job. In the description below, it is assumed that elements denoted by the same reference signs as in the first embodiment basically have the same configurations and functions as those described in the first embodiment unless otherwise described, and parts different from the first embodiment will be mainly described.

Figure 15:
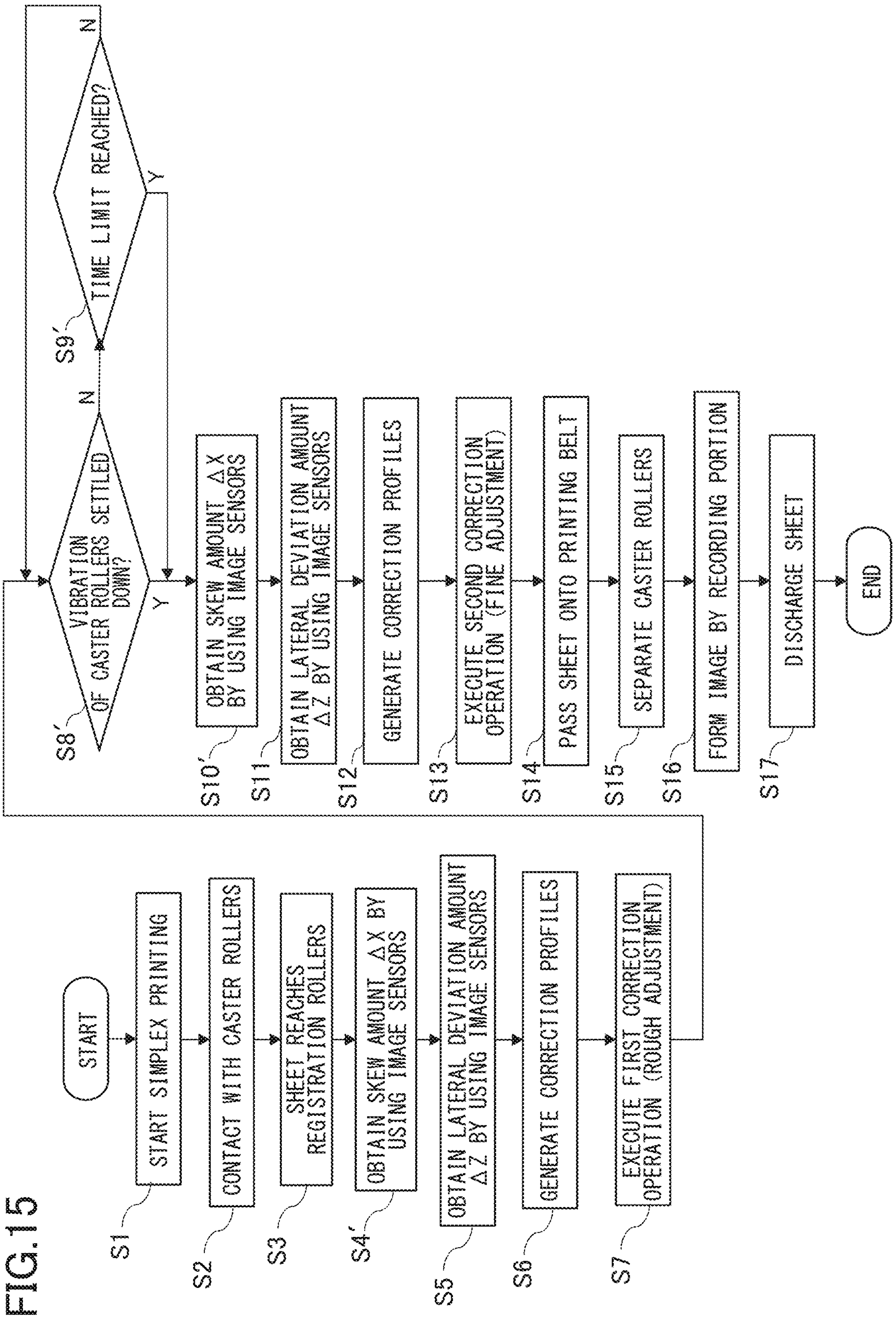
FIG. 15 is a flowchart illustrating a control example according to the second embodiment.

FIG. 15 is a flowchart illustrating a procedure of a simplex print job in the second embodiment. As compared with the first embodiment (FIG. 13), S4, S8, S9, and S10 are respectively replaced by S4', S8', S9', and S10'. Steps other than S4', S8', S9', and S10' are the same as in the first embodiment (FIG. 13), and therefore the description thereof will be omitted.

In S4', the controller 50 detects end positions of the sheet S a plurality of times by the image sensors 101 and 102, and obtains the skew amount $\Delta X$ on the basis of the detection result thereof. Examples of a method of obtaining the skew amount $\Delta X$ by using the image sensors 101 and 102 include a method of obtaining the inclination of the leading end of the sheet S by detecting (edge detection) of the leading end of the sheet S on the basis of two-dimensional image data in which line images obtained by successive imaging are arranged in the sub-scanning direction. The procedure of performing the first correction operation (S7) including the skew correction of the sheet S on the basis of the obtained skew amount $\Delta X$ is the same as in the first embodiment.

In S8', the controller 50 monitors the vibration of the caster rollers 120 and 121 in the pivot direction by using the pivot angle sensors 133 and 134 since the end of the first correction operation (S7). In the present embodiment, it is determined that the vibration of the caster rollers 120 and 121 in the pivot direction has settled down when the deviation ($\Delta L\theta$ and $\Delta R\theta$) of the pivot angles of the caster rollers 120 and 121 from the steering angles $L\theta$ and $R\theta$ are equal to or smaller than a preset threshold value.

In the case (S8'Y) where it is determined that the vibration of the caster rollers 120 and 121 has settled down in S8', the controller 50 proceeds to S10. That is, in the present embodiment, the process proceeds to S10' and the second correction operation (S13) is started, immediately after the vibration of the pivot angles of the caster rollers 120 and 121 has settled down after the first correction operation (S7).

In contrast, in the case (S8'N) where it is determined that the vibration of the caster rollers 120 and 121 has not settled down in S8', the controller 50 proceeds to S9'. In S9', the controller 50 determines whether or not a time limit to start the second correction operation has been reached. The time limit is set in advance as a timing that is the latest to start the second correction operation to complete the second correction operation before the sheet S is passed onto the printing belt 225. The time limit is, for example, an upper limit of an elapsed time from the time point at which the leading end of the sheet S reaches the image sensors 101 and 102.

In the case where it is determined in S9' that the time limit has been reached before it is determined in S8' that the vibration of the caster rollers 120 and 121 has settled down, the controller 50 forcibly proceeds to S10' to start the second correction operation (S13).

In S10', the controller 50 detects end positions of the sheet S a plurality of times by the image sensors 101 and 102, and obtains the skew amount ΔX of the sheet S again on the basis of the detection result thereof. The procedure of performing the second correction operation (S13) including skew correction of the sheet S on the basis of the obtained skew amount ΔX is the same as in the first embodiment.

Summary of Present Embodiment

The controller 50 of the present embodiment executes a determination process (S8') serving as a predetermined process on the basis of the detection result of the pivot angle sensors 133 and 134. Particularly, the controller 50 of the present embodiment executes, on the basis of the detection result of the pivot angle sensors 133 and 134, the determination process (S8') for starting the second correction operation after the vibration of the caster rollers 120 and 121 has settled down for the current sheet. In other words, the control portion executes a determination process in which whether or not the vibration of the follower roller has settled down is determined on the basis of the detection result of the first detection portion and in which the start of the correction operation (S13) is allowed in the case where it is determined (S8'Y) that the vibration of the follower roller has settled within a predetermined range. Therefore, the influence, on the correction operation, of the vibration of the follower roller in the pivot direction caused when the driving roller and the follower roller are brought into contact with each other can be reduced.

That is, according to the present embodiment, a sheet conveyance apparatus and an image forming apparatus capable of improving the correction precision of the positional deviation of the sheet can be provided.

In addition, in the present embodiment, in the case where a predetermined time (time limit) has elapsed since the end of the first correction operation, the start of the second correction operation is allowed (S9'Y) regardless of whether or not it is determined that the vibration of the caster rollers 120 and 121 has settled down. Therefore, the stability of the operation is improved by suppressing a situation in which the second correction operation is not executed, and the second correction operation is started in a state which the vibration of the caster rollers 120 and 121 has become as small as possible even if the vibration does not settle down quickly. Therefore, the stability of the operation of the apparatus and improvement in the correction precision of the positional deviation of the sheet can be achieved simultaneously.

In addition, according to the present embodiment, the second correction operation can be started quickly in the case where the vibration of the caster rollers 120 and 121 has settled down quickly after the first correction operation. In this case, the correction precision can be further improved by elongating the reference profile used for the second correction operation in the time axis direction (and reducing the correction amount in response to this).

Third Embodiment

As a third embodiment, an example in which the configuration related to the detection of the vibration of the caster rollers 120 and 121 is different from the first embodiment will be described. In the description below, it is assumed that elements denoted by the same reference signs as in the first embodiment basically have the same configurations and functions as those described in the first embodiment unless otherwise described, and parts different from the first embodiment will be mainly described.

Figure 16:
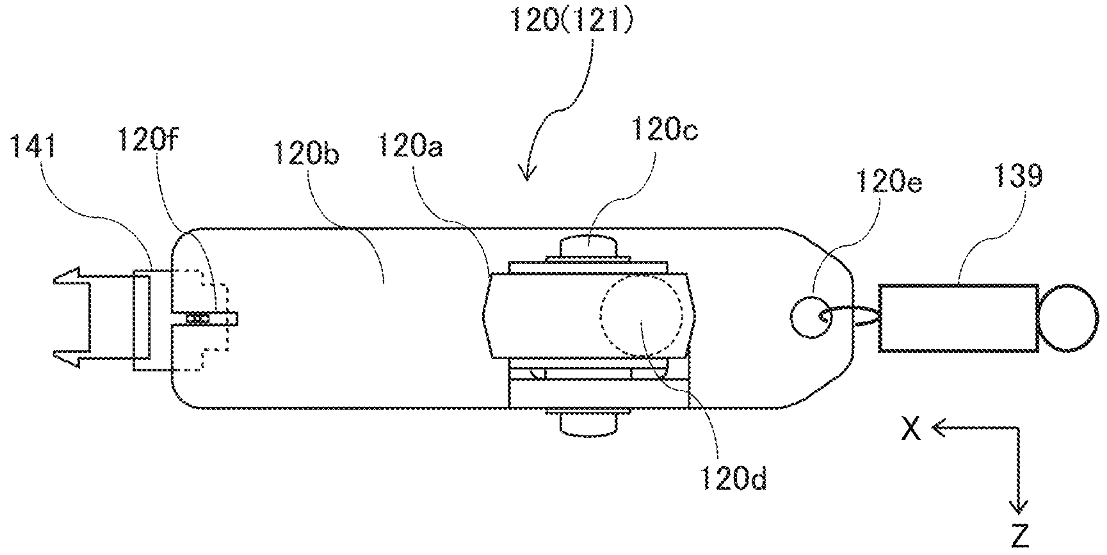
FIG. 16 is an explanatory diagram of an optical sensor according to a third embodiment.

As illustrated in FIG. 16, the registration unit 100 of the present embodiment includes a home position sensor 142 serving as a vibration detection portion that detects the vibration of the caster roller 120. The home position sensor 142 is, for example, an optical sensor (photo-interrupter) including a light emitting element and a light receiving element and capable of detecting a slit 120*f* provided in the base portion 120*b* of the caster roller 120. That is, the home position sensor 142 outputs a detection signal indicating a state (transmitting state) in which the light of the light emitting element reaches the light receiving element through the slit 120*f*, and a state (blocking state) in which the light of the light emitting element is blocked by the base portion 120*b*. The slit 120*f* is formed such that the home position sensor 142 is in the transmitting state in the case where the pivot angle of the caster roller 120 is within a predetermined range centered on 0°, and the home position sensor 142 is in the blocking state in which the pivot angle is out of the predetermined range. That is, the home position sensor 142 is configured such that the detection signal thereof differs between a state in which the caster roller 120 (follower roller) is within the predetermined range in the pivot direction and a state in which the caster roller 120 is out of the predetermined range in the pivot direction.

To be noted, the home position sensor 142 is attached to the roller holder 135 (FIG. 6A) pivotably holding the caster roller 120. In addition, a similar home position sensor is also disposed in the caster roller 121. The home position sensor 142 is an example of a first detection portion configured to detect the vibration of the caster rollers 120 and 121 (follower rollers) in the pivot direction.

The home position sensors 142 described above may be used as vibration detection portions instead of the pivot angle sensors 133 and 134 of the first embodiment and the second embodiment. In the case of the flow (FIG. 13) of the first embodiment, the controller 50 can determine (S8Y) that the vibration of the caster rollers 120 and 121 has settled down in the case where the detection signal of the home position sensor 142 indicates the transmitting state throughout the settlement determination section. In addition, in the case of the flow (FIG. 15) of the second embodiment, the controller 50 can determine (S8'Y) that the vibration of the caster rollers 120 and 121 has settled down in the case where the detection signal of the home position sensor 142 has switched from the blocking state to the transmitting state after the first correction operation (S7).

A similar advantage to the first embodiment and the second embodiment can be obtained also in the case of using the home position sensor 142 as described above.

To be noted, a vibration detection portion different from the pivot angle sensors 133 and 134 and the home position sensor 142 may be used. For example, an optical sensor that detects a flag provided to protrude from the base portion 120*b* of the caster roller 120 may be used.

Fourth Embodiment

In the first to third embodiments, configurations in which correction operation (second correction operation) is executed by using the detection result of the vibration detection portion after the pivot of the caster roller 120 in the pivot direction has settled down have been described. However, the vibration detection portion can be omitted if the correction operation is configured to be executed after the pivot of the caster roller 120 in the pivot direction has settled down as a result.

Figure 17:
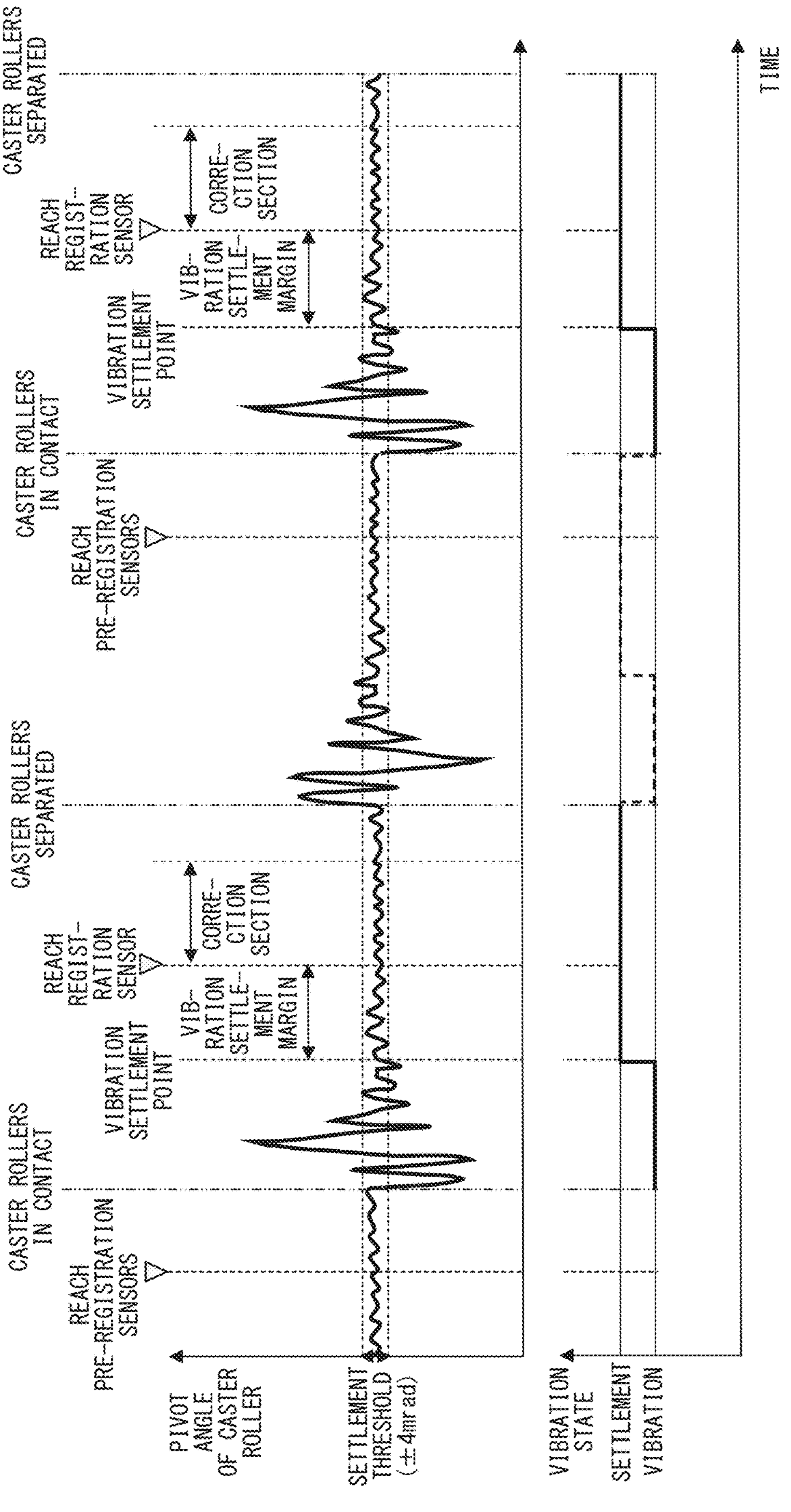
FIG. 17 is a diagram illustrating an example of change in a pivot angle of a caster roller according to a fourth embodiment.
Figure 18:
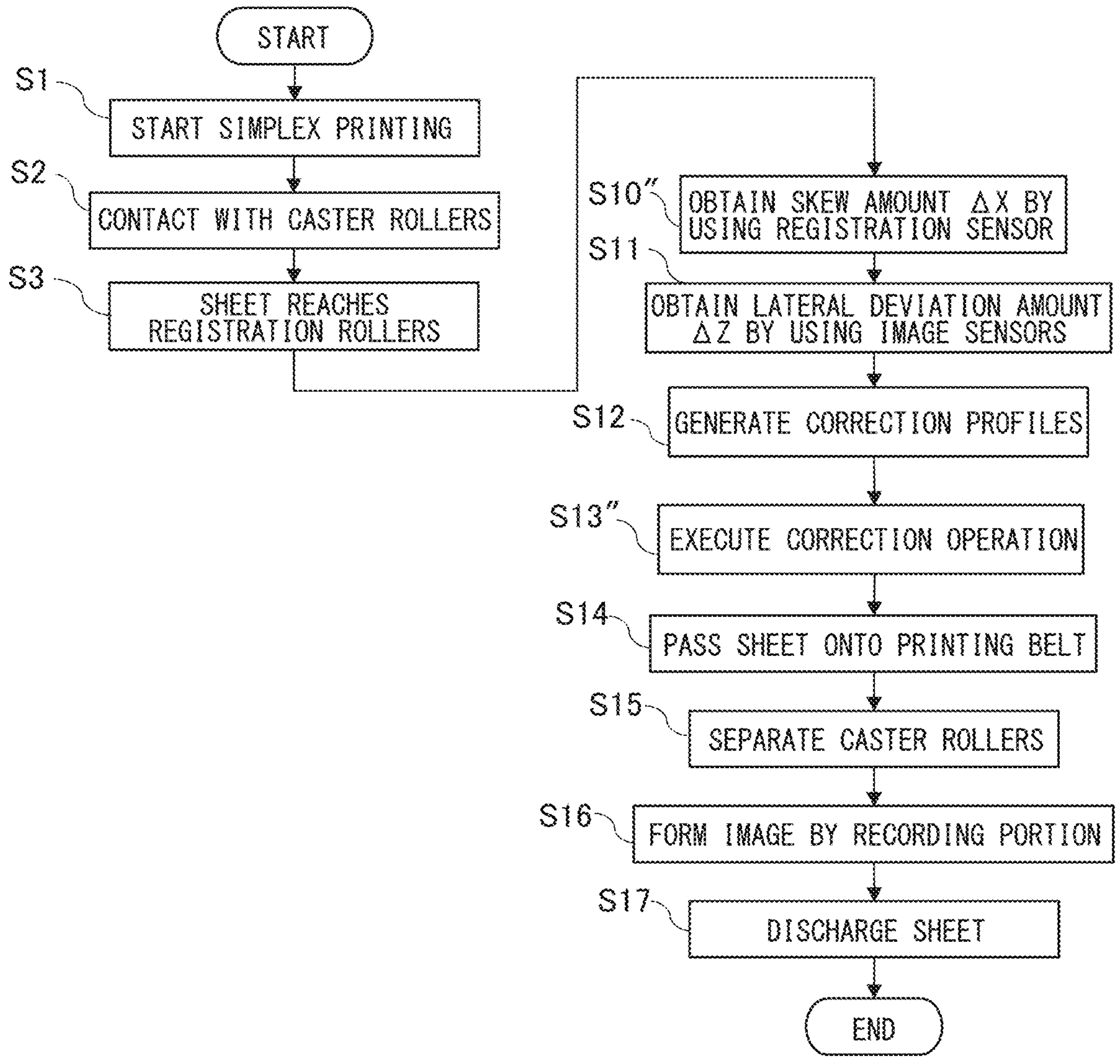
FIG. 18 is a flowchart illustrating a control example according to the fourth embodiment.

The control in the present embodiment will be described with reference to FIGS. 17 and 18. The upper half of FIG. 17 illustrates an example of change in the pivot angles of the caster rollers 120 and 121. The lower half of FIG. 17 is a conceptual diagram illustrating whether or not there is a vibration of the caster rollers 120 and 121 in the pivot direction. FIG. 18 is a flowchart illustrating an execution procedure of a simplex print job in the present embodiment.

In the present embodiment, the correction operation is performed only once in the registration unit 100. That is, as illustrated in FIG. 18, processing (S4 to S9 of FIG. 13) related to the first correction operation in the first embodiment is not performed, and only a correction operation is performed in S13".

In S10", the controller 50 obtains the skew amount ΔX of the sheet S on the basis of a detection result of a registration sensor (corresponding to the second registration sensors 122 and 123 of the first embodiment). In S11 and S12, the controller 50 obtains the lateral deviation amount ΔZ of the sheet S by a similar method to that in the first embodiment, and thus generates operation profiles for the correction operation. Then, in S13", the controller 50 executes the correction operation in accordance with the operation profiles. The processing of S1 to S3 and S14 to S17 is the same as in the first embodiment, and therefore the description thereof will be omitted.

As illustrated in FIG. 17, the timing at which the leading end of the sheet reaches the registration sensor is after a timing (vibration settling point) when the vibration of the caster rollers 120 and 121 settles down after the registration rollers 109 and 110 come into contact with the caster rollers 120 and 121. That is, the contact timing of the registration rollers 109 and 110 and the positioning of the registration sensor are determined such that there is a margin between the vibration settlement of the caster roller 120 and a period (correction section) in which the correction operation is performed.

According to the present embodiment, as a result, the correction operation is started after the vibration of the caster rollers 120 and 121 has settled down. Therefore, a similar advantage to the first embodiment can be obtained. The present embodiment is particularly effective in the case where the skew and lateral deviation of the sheet S are relatively small when the sheet S reaches the registration unit 100.

To be noted, the settlement of the vibration of the caster roller 120 can be made earlier by adjusting the mass of the caster rollers 120 and 121 and the urging force of the auxiliary spring 139. In addition, in the present embodiment, an example in which the settlement of the vibration of the caster rollers 120 and 121 is guaranteed by the placement of the registration sensor has been described. The configuration is not limited to this, and for example, in the case where the skew amount ΔX is obtained by using the image sensors 101 and 102 as in the second embodiment, the settlement of the vibration of the caster rollers 120 and 121 may be guaranteed by adjusting the acquisition timing of the skew amount ΔX.

Modification Example

In addition, the required precision of the skew correction and lateral deviation correction is not high, the steering function of the registration rollers 109 and 110 may be omitted. In this case, the skew and lateral deviation can be simultaneously corrected by adjusting the speed difference between the left and right conveyance driving motors 105 and 106 and the passing timing of the sheet S onto a downstream conveyance member. In either case, the correction precision of the posture (skew and/or lateral deviation) of the sheet can be improved by starting the correction operation after the vibration of the caster rollers 120 and 121 in the pivot direction has sufficiently settled down.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-045428, filed Mar. 21, 2024, which is hereby incorporated by reference herein in its entirety.

What is claimed is:

1. A sheet conveyance apparatus comprising:
a driving roller configured to rotate by receiving a driving force;
a steering portion configured to change an inclination angle of a rotational axis of the driving roller with respect to a sheet width direction orthogonal to a sheet conveyance direction;
a follower roller configured to nip and convey a sheet together with the driving roller and pivot about a pivot axis intersecting with both the sheet conveyance direction and the sheet width direction by following change in the inclination angle of the driving roller;
a contact/separation mechanism configured to switch the driving roller and the follower roller between a contact state in which the driving roller and the follower roller are in contact with each other and a separation state in which the driving roller and the follower roller are separated from each other;
a first detection portion configured to detect vibration of the follower roller in a pivot direction about the pivot axis;
a second detection portion configured to detect positional deviation of the sheet; and
a control portion configured to execute a correction operation of correcting the positional deviation of the sheet on a basis of a detection result of the second detection portion and to execute a predetermined process on a basis of a detection result of the first detection portion, the predetermined process being a process for causing the correction operation to be started after the driving roller and the follower roller have been switched from the separation state to the contact state and after the vibration of the follower roller has settled down within a predetermined range.

2. The sheet conveyance apparatus according to claim 1, wherein the control portion is configured to execute the correction operation on a basis of a detection result of the positional deviation of the sheet that is detected by the second detection portion after the vibration of the follower roller has settled down.

3. The sheet conveyance apparatus according to claim 1,
wherein the correction operation is a second correction operation,
wherein the control portion is configured to execute, before the second correction operation, a first correction operation of correcting the positional deviation of the sheet by using the driving roller and the follower roller, and
wherein the control portion is configured to start the first correction operation after the driving roller and the follower roller have been switched from the separation state to the contact state and before the vibration of the follower roller in the pivot direction settles down.

4. The sheet conveyance apparatus according to claim 1,
wherein the correction operation is a second correction operation,
wherein the control portion is configured to execute, before the second correction operation, a first correction operation of correcting the positional deviation of the sheet by using the driving roller and the follower roller, and
wherein the predetermined process is a process of, in a case where the vibration of the follower roller does not settle down before starting the second correction operation on a current sheet during execution of a job of successively conveying a plurality of sheets, changing an execution condition of the first correction operation such that an end timing of the first correction operation on a succeeding sheet conveyed after the current sheet becomes earlier.

5. The sheet conveyance apparatus according to claim 4, wherein, by executing the predetermined process, the control portion is configured to shorten a period in which the rotational axis of the driving roller is inclined by the steering portion in the first correction operation.

6. The sheet conveyance apparatus according to claim 4,
wherein the driving roller is a first driving roller,
wherein the sheet conveyance apparatus further comprises a second driving roller aligned with the first driving roller in the sheet width direction,
wherein a conveyance speed of the second driving roller is controlled independently from the first driving roller, and
wherein, by executing the predetermined process, the control portion is configured to shorten a period in which a conveyance speed difference between the first driving roller and the second driving roller is generated in the first correction operation.

7. The sheet conveyance apparatus according to claim 4, further comprising:
a third detection portion configured to detect positional deviation of the sheet; and
a fourth detection portion disposed at a position upstream of the third detection portion in the sheet conveyance direction and configured to detect positional deviation of the sheet,
wherein, by executing the predetermined process, the control portion is configured to switch a detection result to be used for the first correction operation from a detection result of the third detection portion to a detection result of the fourth detection portion.

8. The sheet conveyance apparatus according to claim 1, wherein the predetermined process is a determination process of determining whether or not the vibration of the follower roller has settled down on the basis of the detection result of the first detection portion and allowing start of the correction operation in a case where it is determined that the vibration of the follower roller has settled down within the predetermined range.

9. The sheet conveyance apparatus according to claim 8,
wherein the correction operation is a second correction operation,
wherein the control portion is configured to execute, before the second correction operation, a first correction operation of correcting the positional deviation of the sheet, and
wherein, in a case where a predetermined time has elapsed after the first correction operation has been finished, the control portion is configured to allow start of the second correction operation regardless of whether or not it is determined that the vibration of the follower roller has settled down within the predetermined range.

10. The sheet conveyance apparatus according to claim 1, wherein the control portion is configured to determine that the vibration of the follower roller has settled down, in a case where difference between an angle of the follower roller in the pivot direction and the inclination angle of the driving roller is within the predetermined range for a predetermined period.

11. The sheet conveyance apparatus according to claim 1, wherein the control portion is configured to determine that the vibration of the follower roller has settled down, in a case where difference between an angle of the follower roller in the pivot direction and the inclination angle of the driving roller is within the predetermined range.

12. The sheet conveyance apparatus according to claim 1, wherein the driving roller is a first driving roller, the steering portion is a first steering portion, and the follower roller is a first follower roller, and wherein the sheet conveyance apparatus further comprises:

a second driving roller aligned with the first driving roller in the sheet width direction;

a second steering portion configured to change an inclination angle of a rotational axis of the second driving roller with respect to the sheet width direction; and a second follower roller configured to nip and convey the sheet together with the second driving roller and pivot by following change in the inclination angle of the second driving roller.

13. The sheet conveyance apparatus according to claim 12, wherein the control portion is configured to correct the positional deviation of the sheet in the sheet width direction by controlling the inclination angle of the first driving roller and the inclination angle of the second driving roller on a basis of a detection result of the second detection portion in the correction operation.

14. The sheet conveyance apparatus according to claim 12, wherein a conveyance speed of the second driving roller is controlled independently from the first driving roller, and wherein, in the correction operation, the control portion is configured to correct skew of the sheet by controlling a conveyance speed difference between the first driving roller and the second driving roller on a basis of a detection result of the second detection portion.

15. The sheet conveyance apparatus according to claim 12, wherein the correction operation is a second correction operation, and wherein the control portion is configured to execute, before the second correction operation, a first correction operation of correcting the positional deviation of the sheet by using the first driving roller, the second driving roller, the first follower roller, and the second follower roller.

16. The sheet conveyance apparatus according to claim 1, further comprising:

a support member configured to support the follower roller and including a shaft portion extending along the pivot axis;

a roller holder configured to hold the shaft portion such that the shaft portion is pivotable about the pivot axis; and an urging member coupled to the support member and the roller holder and configured to urge the support member so as to reduce an inclination angle of a rotational axis of the follower roller with respect to the sheet width direction toward 0.

17. The sheet conveyance apparatus according to claim 1, wherein the first detection portion is a rotary encoder configured to detect an angle of the follower roller in the pivot direction.

18. The sheet conveyance apparatus according to claim 1, wherein the first detection portion is an optical sensor configured such that a detection signal thereof differs between a state in which the follower roller is within the predetermined range in the pivot direction and a state in which the follower roller is out of the predetermined range in the pivot direction.

19. The sheet conveyance apparatus according to claim 1, wherein the second detection portion includes two or more sensors configured to detect the sheet at positions away from each other in the sheet width direction.

20. The sheet conveyance apparatus according to claim 1, wherein the second detection portion is an image sensor including an imaging region extending in the sheet width direction.

21. An image forming apparatus comprising:

the sheet conveyance apparatus according to claim 1; and an image forming portion configured to form an image on a sheet conveyed by the sheet conveyance apparatus.

* * * * *